(12) United States Patent
Mori

(10) Patent No.: US 6,384,927 B1
(45) Date of Patent: *May 7, 2002

(54) INTERNET FACSIMILE MACHINE

(75) Inventor: Yukikazu Mori, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,864

(22) Filed: Oct. 8, 1997

(30) Foreign Application Priority Data

Oct. 11, 1996 (JP) .............................................. 8-287250
Oct. 15, 1996 (JP) .............................................. 8-291301

(51) Int. Cl.[7] ................................................ H04N 1/00
(52) U.S. Cl. ...................... 358/1.15; 358/407; 358/440; 358/442; 379/100.09
(58) Field of Search ................................ 358/402, 403, 358/407, 408, 434, 435, 436, 440, 1.15, 468, 442; 379/93.24, 100.09, 130, 100.01; 395/200.3, 200.47; 709/203, 217, 218, 219, 238, 245

(56) References Cited

U.S. PATENT DOCUMENTS

| 5,014,300 A | * | 5/1991 | Harvath et al. ......... 379/100.09 |
| 5,521,719 A | * | 5/1996 | Yamada ...................... 358/438 |
| 5,608,786 A | * | 3/1997 | Gordon ...................... 358/402 |
| 5,712,907 A | * | 1/1998 | Wegner et al. .............. 379/112 |
| 5,805,298 A | * | 9/1998 | Ho et al. .................... 358/402 |
| 5,815,669 A | * | 9/1998 | Lee et al. ................... 709/238 |
| 5,835,579 A | * | 11/1998 | Gersi et al. ............. 379/100.17 |
| 5,859,967 A | * | 1/1999 | Kaufeld et al. .......... 395/200.3 |
| 5,872,779 A | * | 2/1999 | Vaudreuil .................... 370/352 |
| 5,872,845 A | * | 2/1999 | Feder ......................... 358/442 |
| 5,881,233 A | * | 3/1999 | Toyoda et al. .............. 709/233 |
| 5,920,404 A | * | 7/1999 | Weiser ....................... 358/434 |
| 5,991,290 A | * | 11/1999 | Malik ......................... 370/352 |
| 6,011,794 A | * | 1/2000 | Mordowitz et al. ......... 370/389 |
| 6,020,980 A | * | 2/2000 | Freeman ..................... 358/402 |
| 6,028,679 A | * | 2/2000 | Murphy ...................... 358/407 |

FOREIGN PATENT DOCUMENTS

| EP | 0465011 | 1/1992 |
| EP | 0615377 | 9/1994 |
| JP | 5327763 | 12/1993 |
| JP | 8242326 | 9/1996 |
| WO | WO9641463 | 12/1996 |

OTHER PUBLICATIONS

"The Multimedia Fax–Mime Gateway", Sanjiv P. Patel, Grant Henderson and Nicolas D. Georganas, IEEE Multi-Media, 1994 Winter, No. 4, New York, US, pp. 64–70.

"Fax Servers Gain a Routing Standard", James P. Rafferty, Human Communication, Data Communications, Sep. 1993, No. 12, New York, US, pp. 53–56.

* cited by examiner

Primary Examiner—Edward Coles
Assistant Examiner—Joseph R. Pokrzywa
(74) Attorney, Agent, or Firm—Cooper & Dunham LLP

(57) ABSTRACT

The communication cost for image information transmission from a facsimile machine connected to the international PSTN to an overseas destination is significantly reduced by causing a first repeater Internet facsimile machine installed in the same country as the transmitting machine to perform a repeater operation for transferring the image information to a second repeater Internet facsimile machine installed in the same country as the recipient machine. The cost is reduced because no additional communication charge is incurred for the image information transfer between the repeater Internet facsimile machines.

18 Claims, 26 Drawing Sheets

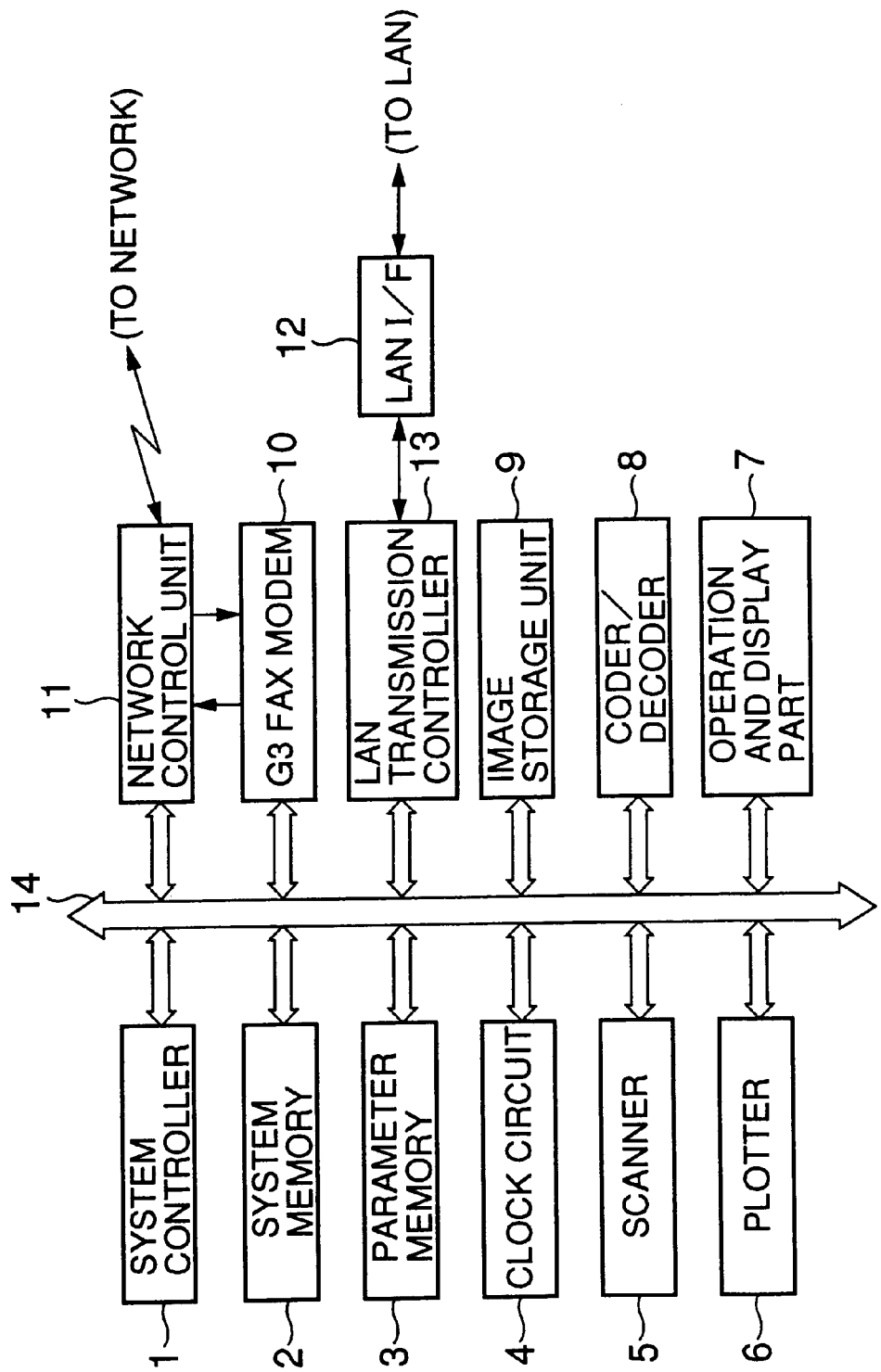

FIG. 3A

| SUBADDRESS NUMBER | CORRESPONDING MAIL ADDRESS |
|---|---|
| 001-1-201-673-XXXX | NETFAX_USA@usabox.****.co.jp |
| 001-1-201-673-YYYY | NETFAX_USA@usabox.****.co.jp |
| 001-1-408-432-ZZZZ | NETFAX_USA@usabox.****.co.jp |
| 001-1-33-99-84-XXXX | NETFAX_FRA@frabox.****.co.jp |
| 001-43-1-ANY | NETFAX_AST@astbox.****.co.jp |

FIG. 3B

| SUBADDRESS NUMBER | CORRESPONDING MAIL ADDRESS |
|---|---|
| 001-1-201-673-XXXX | NETFAX_USA@usabox.****.co.jp |
| 001-1-201-673-YYYY | NETFAX_USA@usabox.****.co.jp |
| 001-1-408-432-ZZZZ | NETFAX_USA@usabox.****.co.jp |
| 001-1-33-99-84-XXXX | NETFAX_FRA@frabox.****.co.jp |
| 001-43-1-ANY | NETFAX_AST@astbox.****.co.jp |
| 0001 | NETFAX_GERM@germbox.****.co.jp |
| 0002 | NETFAX_USA@usabox.****.co.jp |

FIG. 4A

```
Date:Tue,23 Jul 1996 15:45:21+0900
Message-ID:<XXXXXXXXXXXXX@jpnbox.****.co.jp>
From:<NETFAX_JPN@jpnbox.****.co.jp>
To:<NETFAX_USA@usabox.****.co.jp
Subject:0201.603-xxxx
Mime-Version:1.0
Content-Transfer-Encoding:base64

0M8R4KGxGuEAAAAAAAAAAAAAAAAAAAAAOwADAP7/CQAGA
AAAAAAAAAAAAAABAAAAQAAAAAAAAAAEAAAgAAAAEAAA
D+////AAAAAAAAAD////////////////////////////////////////////////
////////////////////
```

FIG. 4B

```
Date:Tue,23 Jul 1996 15:45:21+0900
Message-ID:<XXXXXXXXXXXXX@jpnbox.****.co.jp>
From:<NETFAX_JPN@jpnbox.****.co.jp>
To:<NETFAX_USA@usabox.****.co.jp
Subject:000
Mime-Version:1.0
Content-Transfer-Encoding:base64

0M8R4KGxGuEAAAAAAAAAAAAAAAAAAAAAOwADAP7/CQAGA
AAAAAAAAAAAAAABAAAAQAAAAAAAAAAEAAAgAAAAEAAA
D+////AAAAAAAAAD////////////////////////////////////////////////
////////////////////
```

FIG. 10

```
Date:Tue,23 Jul 1996 15:45:21+0900
Message-ID:<XXXXXXXXXXXXX@jpnbox.****.co.jp>
From:<NETFAX_JPN@jpnbox.****.co.jp>
To:<NETFAX_USA@usabox.****.co.jp
Subject:message transfer
Mime-Version:1.0
Content-Type:multipart/mixed
boundary="······=_NextPart_000_01BB8B57.928620E0"

······=_NextPart_000_01BB8B57.928620E0
Content-Type:text/plain;charset="ISO-2022-JP"
Content-Transfer-Encoding:7bit

[transfer to]   0201-603-xxxx

······=_NextPart_000_01BB8B57.928620E0
Content-Type:   application/octet-stream;   name=Internet Fax
Content-Transfer-Encoding:base64

0M8R4KGxGuEAAAAAAAAAAAAAAAAAAAAAOwADAP7/CQAGA
AAAAAAAAAAAAAABAAAAQAAAAAAAAAEAAAAgAAAAEAAA
D+////AAAAAAAAAD///////////////////////////////////////////////////////////////
////////////////////////
```

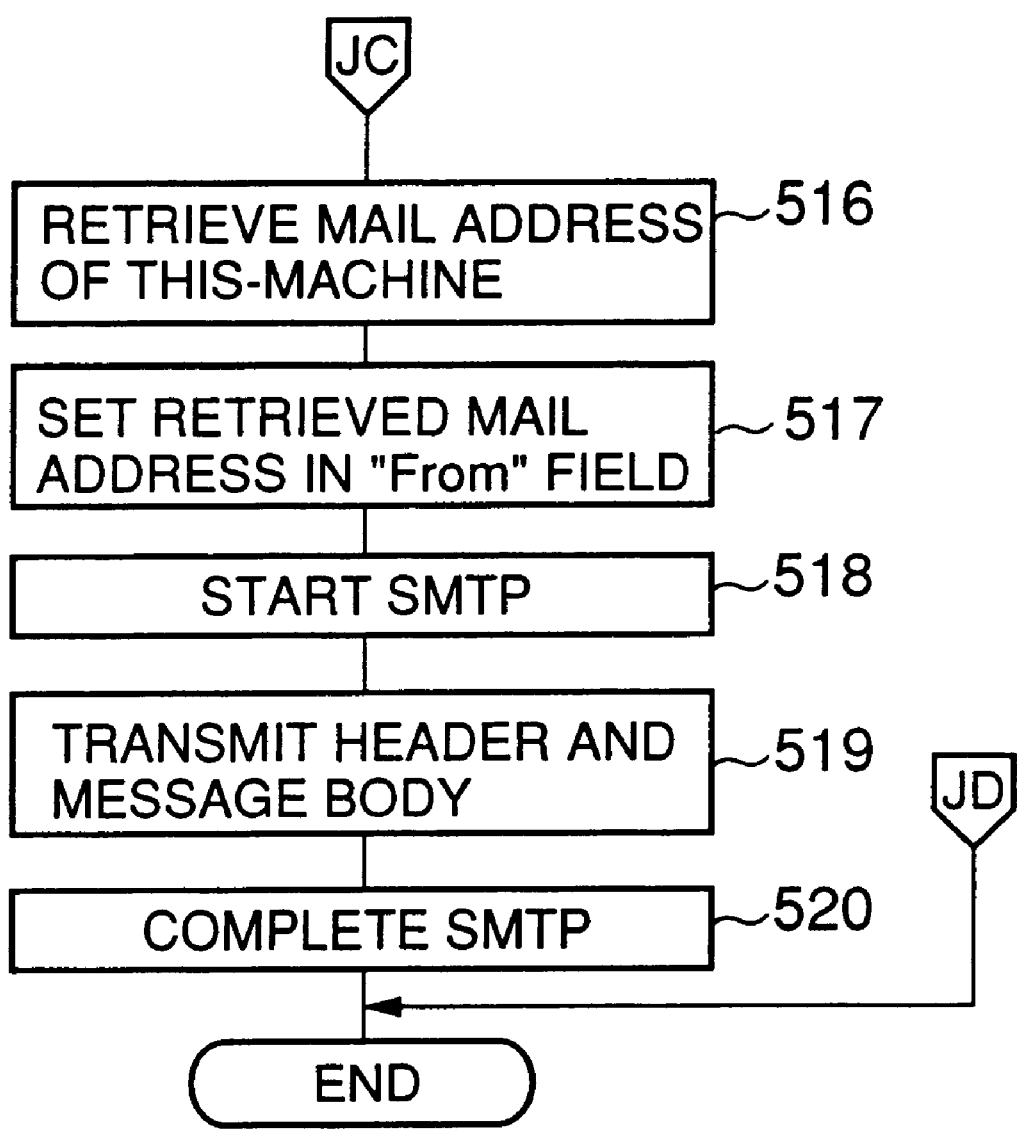

FIG. 13A

| FACSIMILE NUMBER | CORRESPONDING MAIL ADDRESS |
|---|---|
| 001-1-201-673-XXXX | NETFAX_USA@usabox.****.co.jp |
| 001-33-99-84-XXXX | NETFAX_FRA@frabox.****.co.jp |
| 001-43-1-797-11-XXXX | NETFAX_AST@astbox.****.co.jp |
| ……… | ……… |

FIG. 13B

| FACSIMILE NUMBER | CORRESPONDING MAIL ADDRESS | NETFAX. Flag | TRANSFER DESTINATION FACSIMILE NUMBER |
|---|---|---|---|
| 001-1-201-673-XXXX | NETFAX_USA@usabox.****.co.jp | ON | 001-1-201-673-YYYY<br>001-1-408-432-ZZZZ |
| 001-43-ANY | NETFAX_AST@astbox.****.co.jp | ON | |
| *01 | NETFAX_FRA@frabox.****.co.jp | ON | 99-84-XXXX |
| *02 | *@cs.**.co.jp | OFF | |
| *03 | NETFAX_FRA@frabox.****.co.jp | ON | |

FIG. 14

```
Date:Tue,23 Jul 1996 15:45:21+0900
Message-ID:<XXXXXXXXXXXXX@jpnbox.****.co.jp>
From:Marketing_DIV1<NETFAX_JPN@jpnbox.****.co.jp>
To:<NETFAX_USA@usabox.****.co.jp
Mime-Version:1.0
Content-Transfer-Encoding:base64

0M8R4KGxGuEAAAAAAAAAAAAAAAAAAAAAAOwADAP7/CQAGA
AAAAAAAAAAAAAABAAAAQAAAAAAAAAEAAAAgAAAAEAAA
D+////AAAAAAAAAD/////////////////////////////////////////////////////
///////////////////////
```

FIG. 16

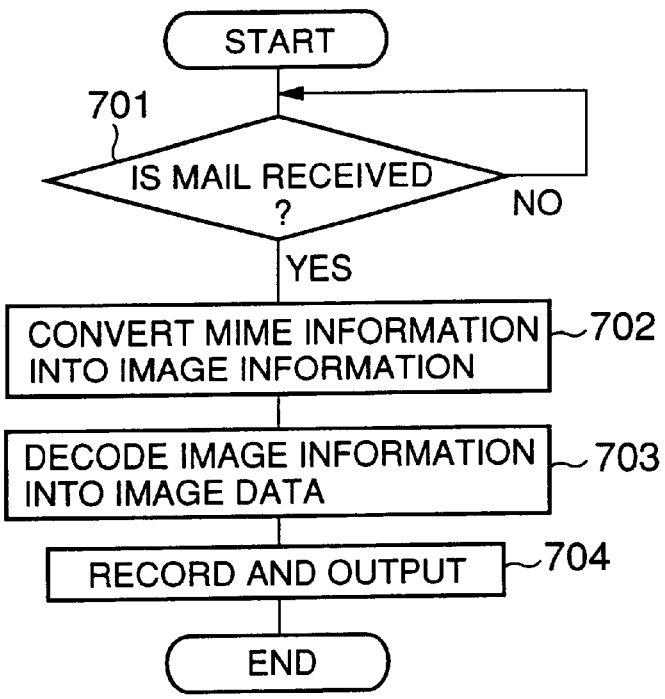

START → 701 IS MAIL RECEIVED ? — NO (loop) / YES
702 CONVERT MIME INFORMATION INTO IMAGE INFORMATION
703 DECODE IMAGE INFORMATION INTO IMAGE DATA
704 RECORD AND OUTPUT
END

FIG. 17

```
Date:Tue,23 Jul 1996 15:45:21+0900
Message-ID:<XXXXXXXXXXXXX@jpnbox.****.co.jp>
From:Marketing_DIV1<NETFAX_JPN@jpnbox.****.co.jp>
To:<NETFAX_USA@usabox.****.co.jp
Mime-Version:1.0
Subject:0201-603-xxxx
Content-Transfer-Encoding:base64

0M8R4KGxGuEAAAAAAAAAAAAAAAAAAAAAAOwADAP7/CQAGA
AAAAAAAAAAAAAABAAAAQAAAAAAAAAEAAAgAAAAEAAA
D+////AAAAAAAAAD////////////////////////////////////////
/////////////////
```

FIG. 20

```
Date:Tue,23 Jul 1996 15:45:21+0900
Message-ID:<YYYYYYYYYYYY@usabox.****.co.jp>
From:<NETFAX_USA@usabox.****.co.jp>
To:<NETFAX_JPN@jpnbox.****.co.jp
Subject:000
Mime-Version:1.0
Content-Type:text/plain;charset="ISO-2022-JP"
Content-Transfer-Encoding:7bit REPORTING ON REQUESTED FACSIMILE TRANSMISSION TO
FACSIMILE NUMBER 0201-603-xxxx No.OF PAGES:  3
TRANSMISSION TIME:  1'20"
TRANSMISSION CHARGE:  US$1.50

TRANSMISSION WAS SUCCESSFUL
```

FIG. 22

Date:Tue,23 Jul 1996 15:45:21+0900
Message-ID:<XXXXXXXXXXXXXX@jpnbox.****.co.jp>
From:<NETFAX_JPN@jpnbox.****.co.jp>
To:<NETFAX_USA@usabox.****.co.jp
Mime-Version:1.0
Subject:message transfer
Content-Type:multipart/mixed
boundary="······=_NextPart_000_01BB8B57.928620E0"

······=_NextPart_000_01BB8B57.928620E0
Content-Type:text/plain;charset="ISO-2022-JP"
Content-Transfer-Encoding:7bit

[transfer from]   Marketing_DIV1
[transfer to]   0201-603-xxxx

······=_NextPart_000_01BB8B57.928620E0
Content-Type:   application/octet-stream;   name=Internet Fax
Content-Transfer-Encoding: base64

0M8R4KGxGuEAAAAAAAAAAAAAAAAAAAAOwADAP7/CQAGA
AAAAAAAAAAAAABAAAAAQAAAAAAAAAEAAAAgAAAAEAAA
D+////AAAAAAAAD/////////////////////////////////////////
//////////////////

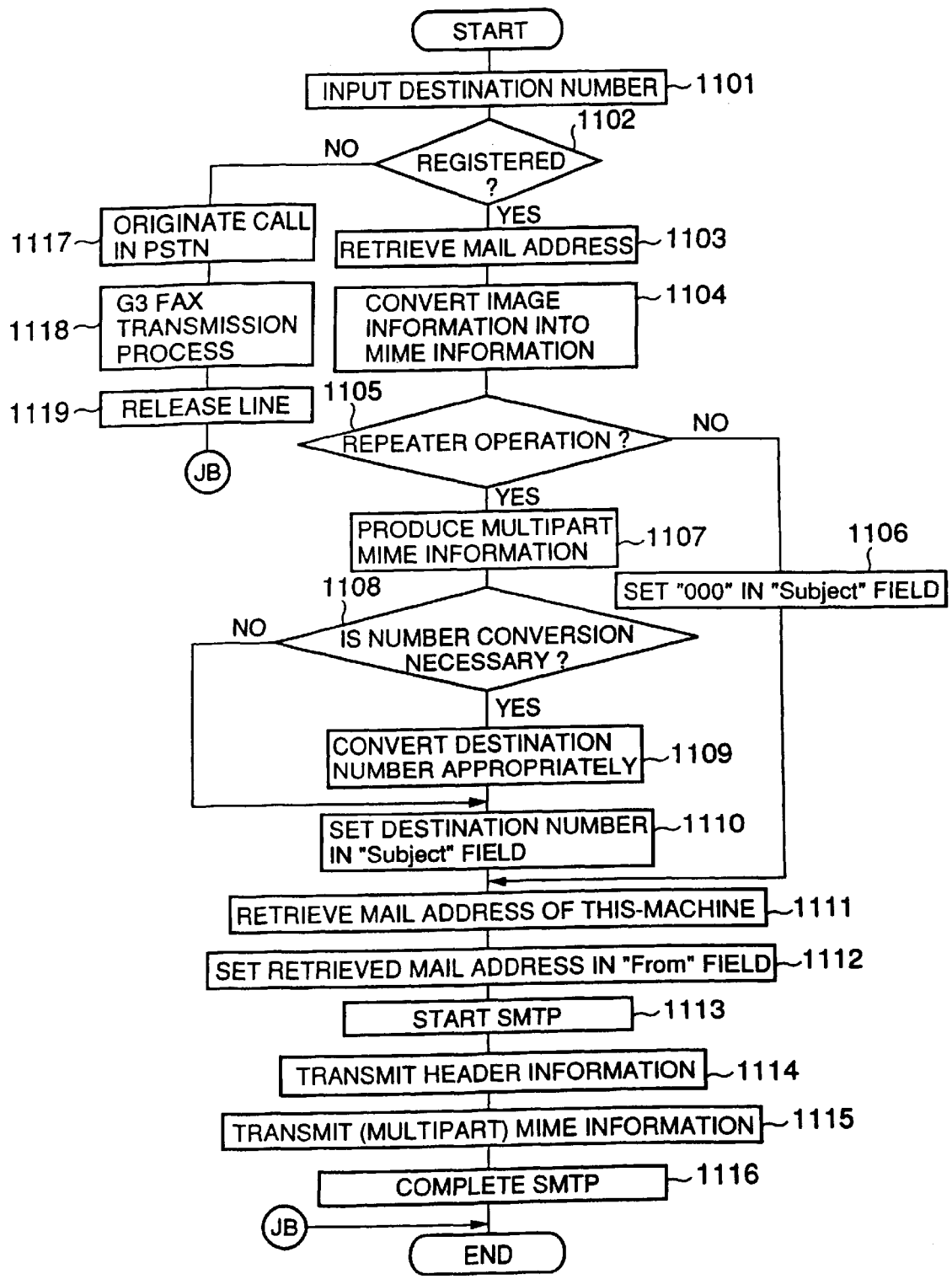

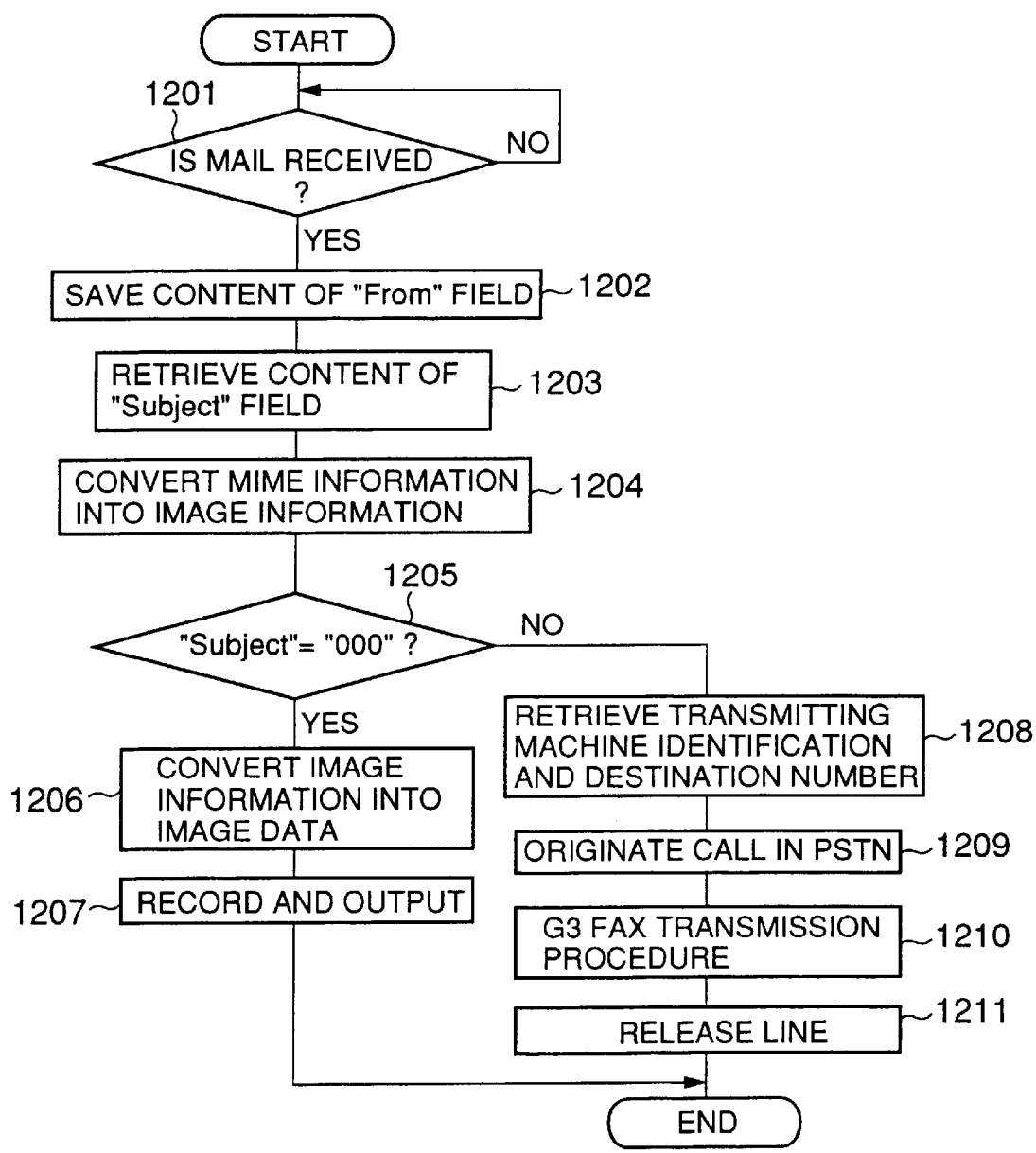

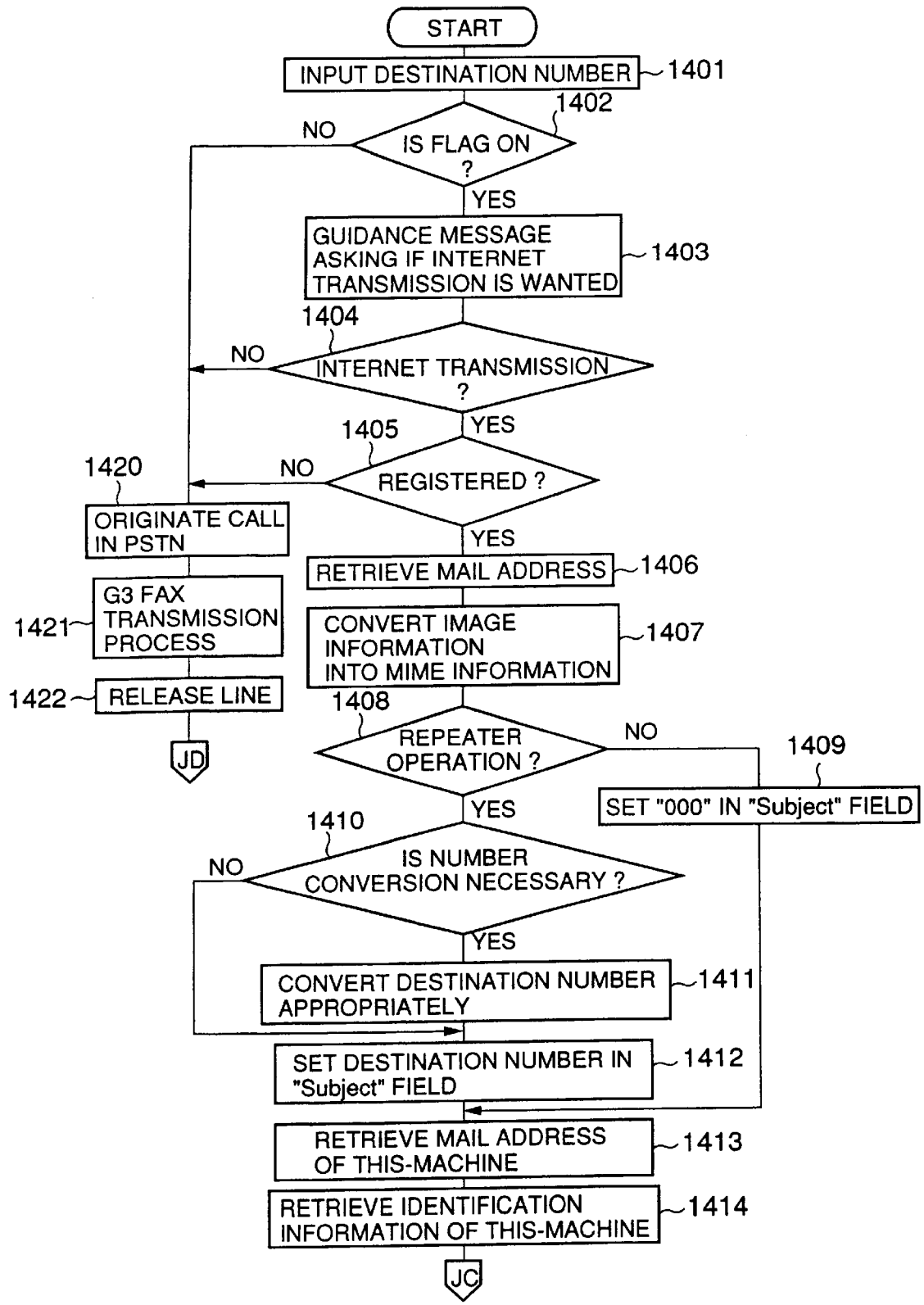

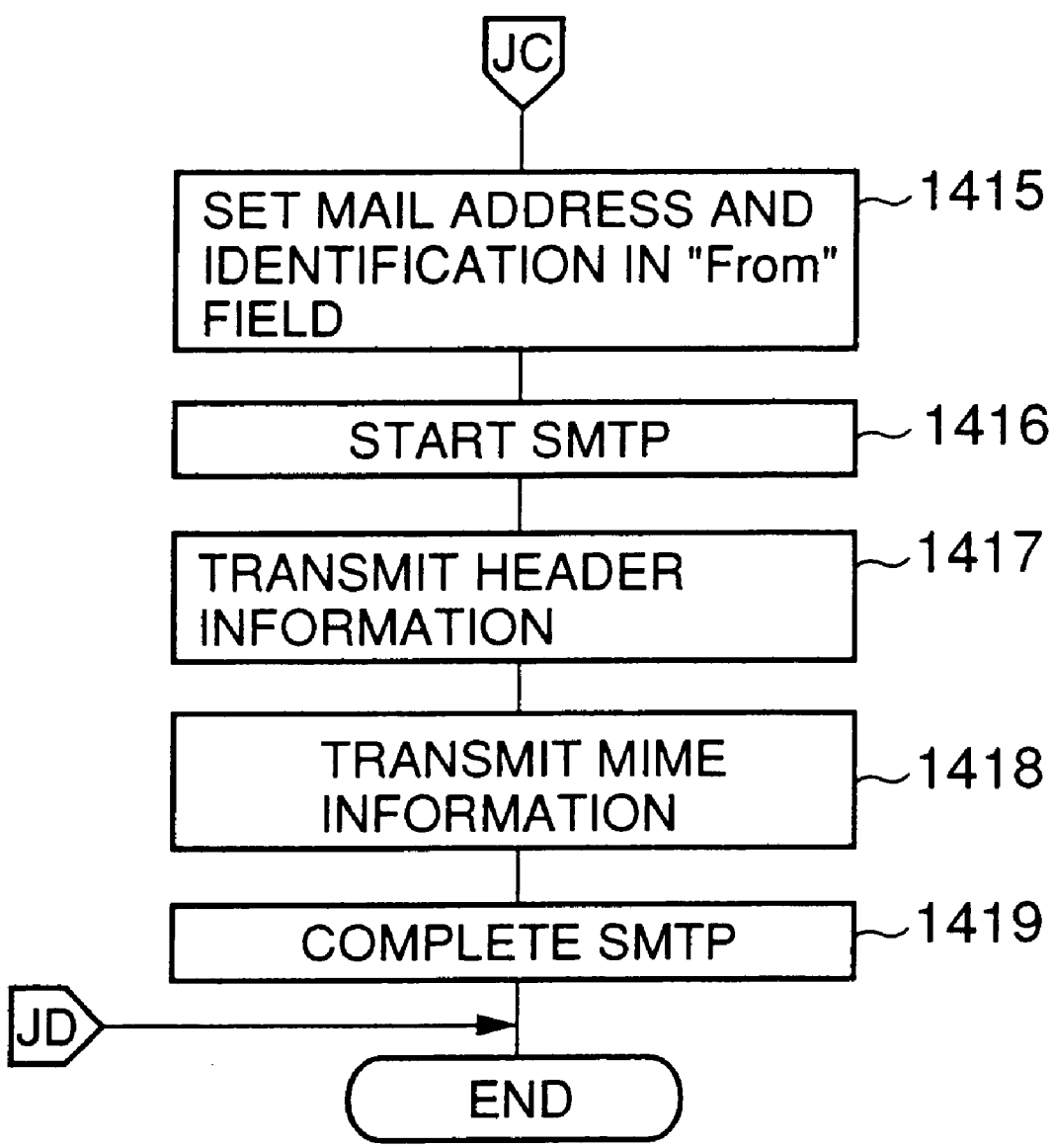

INTERNET FACSIMILE MACHINE

BACKGROUND OF THE INVENTION

1. Field of the Invention

The present invention generally relates to Internet facsimile machines and, more particularly, to an Internet facsimile machine connected to a local area network connected to an Internet service provider via a leased line and provided with a function of exchanging electronic mail data over the local area network and over the Internet, and a function of exchanging facsimile data via a public switched telephone network using a facsimile transmission protocol.

2. Description of the Related Art.

Recently, the widespread availability of the Internet introduced the use of Internet facsimile machines. Internet facsimile machines enable terminals, forming respective local area networks and connected to the Internet by connecting the local area network to an Internet service provider via a leased line, to exchange image information in the form of electronic mail over the Internet.

Some Internet facsimile machines are provided with communication means for communication over the public switched telephone network or an ISDN so as to enable communication with a destination machine connected to the public switched telephone network.

While Internet facsimile machines according to the related art allow peer terminals to exchange data over the Internet and are also capable of exchanging image information with ordinary facsimile machines over the public switched telephone network, the user has to specify, through a manual operation, whether the Internet or the public switched telephone network is to be used. For this purpose, the user has to know whether the destination terminal is connected to the Internet or the public switched telephone network.

SUMMARY OF THE INVENTION

Accordingly, an object of the present invention is to provide Internet facsimile machines in which the aforementioned problem is eliminated.

Another and more specific object is to provide an Internet facsimile machine in which flexibility of image information communication is significantly improved.

Still another object is to provide an Internet facsimile machine in which a transmission operation is simplified.

The aforementioned objects can be achieved by an Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, comprising: subaddress information table means for storing subaddress information received according to the facsimile transmission procedure and mail addresses of the Internet facsimile machines that provide a repeater operation for information destined to a terminal associated with the subaddress, in such a way as to relate each of the subaddresses to the corresponding mail address; mail address retrieving means for searching the subaddress information table means to retrieve the mail address that corresponds to the subaddress received according to the facsimile transmission procedure; and repeater operation requesting means for requesting the Internet facsimile machine associated with the mail address retrieved by the mail address retrieving means to repeat received image information to the terminal associated with the subaddress, by sending an electronic mail message to the Internet facsimile machine associated with the retrieved mail address.

The aforementioned objects can also be achieved by an Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, comprising: subaddress information table means for storing subaddress information received according to the facsimile transmission procedure, repeater mail addresses of the Internet facsimile machines that provide a repeater operation for information destined to a terminal associated with the subaddress, and destination mail addresses of the Internet facsimile machines designated as a destination, in such a way as to relate each of the subaddresses to the corresponding repeater mail address or the corresponding destination mail address; mail address retrieving means for searching the subaddress information table means to retrieve one of the repeater mail address and the destination mail address that corresponds to the subaddress received according to the facsimile transmission procedure; repeater operation requesting means for requesting, when the repeater mail address is retrieved by the mail address retrieving means, the Internet facsimile machine associated with the repeater mail address retrieved by the mail address retrieving means to repeat received image information to the terminal associated with the subaddress, by sending an electronic mail message to the Internet facsimile machine associated with the retrieved mail address; and transmitting means for transmitting, when the destination mail address is retrieved by the mail address retrieving means, the received image information to the Internet facsimile machine associated with the destination mail address retrieved by the mail address retrieving means, by sending an electronic mail message to the Internet facsimile machine associated with the retrieved destination mail address.

According to the aforementioned aspects of the invention, the communication cost is reduced significantly for image information transmission from a facsimile machine connected to the international PSTN to an overseas destination by causing a first repeater Internet facsimile machine installed in the same country as the transmitting machine to perform a repeater operation for transferring the image information to a second repeater Internet facsimile machine installed in the same country as the recipient machine. The cost is reduced because no additional communication charge is incurred for the image information transfer between the repeater Internet facsimile machines.

Further, a facsimile machine connected to the international PSTN is enabled to request a repeater operation, designating any Internet facsimile machine as a final destination. Thus, flexibility of the Internet facsimile machine is significantly improved.

By forming the destination telephone number as part of the message body of an electronic mail message of a multipart MIME type, information necessary for requesting a repeater operation can be sent in an appropriate manner, thus making facsimile information transmission convenient.

The aforementioned objects can also be achieved by an Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, comprising: destination management information storage means for storing mail addresses used to exchange data with compatible Internet facsimile machines over the Internet, and telephone numbers used to exchange data with compatible Internet facsimile machines over the public network, in such a way as to relate each of the mail addresses to the corresponding telephone number; determining means for determining whether a destination telephone number specified by a user input is registered in said destination management information storage means; Internet transmission means for retrieving, when said determining means yields an affirmative answer, the mail address that corresponds to the specified destination telephone number from said destination management information storage means, for converting image information to be transmitted into message body data for an electronic mail message, for setting the retrieved mail address as a destination mail address of the electronic mail message, and for transmitting the resultant electronic mail message to the compatible Internet facsimile machine via the local area network over the Internet; and public network transmission for originating, when said determining means yields a negative answer, a call to a destination terminal associated with the specified destination telephone number using the public network, and for transmitting the image information to the destination terminal in accordance with a predetermined facsimile transmission procedure.

The aforementioned objects can also be achieved by an Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, comprising: destination management information storage means for storing mail addresses used to exchange data with compatible Internet facsimile machines over the Internet, telephone numbers used to exchange data with compatible Internet facsimile machines over the public network, and end terminal telephone numbers used to exchange data with an end terminal served by a repeaters operation of the compatible Internet facsimile machine associated with the telephone number, in such a way as to relate each of the mail addresses to the corresponding telephone number and the end terminal telephone number; determining means for determining whether a destination telephone number specified by a user input is registered as one of the end terminal telephone numbers in said destination management information storage means; Internet transmission means for retrieving, when said determining means yields an affirmative answer, the mail address that corresponds to the specified destination telephone number from said destination management information storage means, for converting image information to be transmitted into message body data for an electronic mail message, for setting the retrieved mail address in a To field of a header information of the electronic mail message, for setting the specified destination telephone number in a Subject field of the header information of the electronic mail message, and for transmitting the resultant electronic mail message to the compatible Internet facsimile machine providing the repeater operation, via the local area network over the Internet; reception means for receiving electronic mail; and reverse conversion means for subjecting the message body data of a received electronic mail message to reverse conversion so as to reproduce image information, when one of the end terminal telephone numbers is set in the Subject field of the header information of the received electronic mail message; forwarding means for originating a call to the end terminal associated with the end terminal telephone number found in the Subject field, using a public network, so as to transmit the image information reproduced by said reverse conversion means to the end terminal.

The aforementioned objects can also be achieved by an Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, comprising: destination management information storage means for storing mail addresses used to exchange data with compatible Internet facsimile machines over the Internet, telephone numbers used to exchange data with compatible Internet facsimile machines over the public network, and end terminal telephone numbers used to exchange data with an end terminal served by a repeater operation of the compatible Internet facsimile machine associated with the telephone number, in such a way as to relate each of the mail addresses to the corresponding telephone number and the end terminal telephone number; determining means for determining whether a destination telephone number specified by a user input is registered as one of the telephone numbers in said destination management information storage means; Internet transmission means for retrieving, when said determining means yields an affirmative answer, the mail address that corresponds to the specified destination telephone number from said destination management information storage means, for converting image information to be transmitted into message body data for an electronic mail message, for setting the retrieved mail address in a To field of a header information of the electronic mail message, for setting a predetermined fixed value in a Subject field of the header information of the electronic mail message, and for transmitting the resultant electronic mail message to the compatible Internet facsimile machine providing the repeater operation, via the local area network over the Internet; reception means for receiving electronic mail; and outputting means for subjecting, when said predetermined fixed value is set in the Subject field of the header information of a received electronic mail message, the message body data of the received electronic mail message to reverse conversion so as to reproduce image information, for decoding the reproduced image information into original image data, and for recording and outputting an image constructed by said image data.

The aforementioned objects can also be achieved by an Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, comprising: destination management information storage means for storing mail addresses used to exchange data with compatible Internet facsimile machines over the Internet, telephone numbers used to exchange data with compatible Internet facsimile machines over the public network, and end terminal telephone numbers used to exchange data with an end terminal served by a repeater operation of the compatible Internet facsimile machine associated with the telephone number, in such a way as to relate each of the mail addresses to the corresponding telephone number and the end terminal telephone number; determining means for determining whether a destination telephone number specified by a user input is registered as one of the end terminal telephone numbers in said destination management information storage means; Internet transmission means for retrieving, when said determining means yields an affirmative answer, the mail address that corresponds to the specified destination telephone number from said destination management information storage means, for converting image information to be transmitted into message body data for an electronic mail message, for setting the retrieved mail address in a To field of a header information of the electronic mail message, for setting the specified destination telephone number in a predetermined area of a message body of the electronic mail message, and for transmitting the resultant electronic mail message to the compatible Internet facsimile machine providing the repeater operation, via the local area network over the Internet; reception means for receiving electronic mail; reverse conversion means for subjecting the message body data of a received electronic mail message to reverse conversion so as to reproduce image information, when one of the end terminal telephone numbers is set in said predetermined area of the message body of the received electronic mail message; and forwarding means for originating a call to the end terminal associated with the end terminal telephone number found in said predetermined area of the message body, using a public network, so as to transmit the image information reproduced by said reverse conversion means to the end terminal.

The aforementioned objects can also be achieved by an Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, comprising: destination management information storage means for storing mail addresses used to exchange data with compatible Internet facsimile machines over the Internet, telephone numbers used to exchange data with compatible Internet facsimile machines over the public network, and end terminal telephone numbers used to exchange data with an end terminal served by a repeater operation of the compatible Internet facsimile machine associated with the telephone number, in such a way as to relate each of the mail addresses to the corresponding telephone number and the end terminal telephone number; determining means for determining whether a destination telephone number specified by a user input is registered as one of the telephone numbers in said destination management information storage means; Internet transmission means for retrieving, when said determining means yields an affirmative answer, the mail address that corresponds to the specified destination telephone number from said destination management information storage means, for converting image information to be transmitted into message body data for an electronic mail message, for setting the retrieved mail address in a To field of a header information of the electronic mail message, for setting a predetermined fixed value in a predetermined area of a message body of the electronic mail message, and for transmitting the resultant electronic mail message to the compatible Internet facsimile machine providing the repeater operation, via the local area network over the Internet; reception means for receiving electronic mail; and outputting means for subjecting, when said predetermined fixed value is set in said predetermined area of the message body of a received electronic mail message, the message body data of the received electronic mail message to reverse conversion so as to reproduce image information, for decoding the reproduced image information into original image data, and for recording and outputting an image constructed by said image data.

According to these aspects of the invention, the Internet is used to transmit image information to an Internet facsimile machine installed at a remote location. Since the Internet requires no additional communication charge, the communication cost is significantly reduced.

By transmitting image information to a facsimile machine at a remote location with the benefit of a repeater operation provided by an Internet facsimile machine close to the facsimile machine, the communication cost for facsimile transmission to an ordinary facsimile machine is significantly reduced.

Since a request for or cancellation of a repeater operation can be specified by the data content set in the Subject field, no special process for decoding an electronic mail message is necessary. A simple feature provided by the invention enables selection between the repeater operation and the recording and outputting of received image information.

Information such as specification of a repeater operation can be sent in the form of message body data of an electronic mail message of a multipart MIME type, a highly flexible transmission operation is possible.

By reporting a result of transmission of image information in the form of electronic mail to the transmitting machine, the transmitting machine learns the result of transmission set by itself appropriately. With this, the convenience of communication management is greatly improved.

The user can configure each Internet facsimile machine so as to request or cancel Internet transmission and also can configure each image information transmission so as to request or cancel Internet transmission. Thus, the user can arbitrary request or cancel image information transmission using the Internet, depending on his or her need.

BRIEF DESCRIPTION OF THE DRAWINGS

Other objects and further features of the present invention will be apparent from the following detailed description when read in conjunction with the accompanying drawings, in which:

FIG. 2 shows a construction of an Internet facsimile machine according to the present invention;

FIG. 3A shows a subaddress conversion table according to the first embodiment;

FIG. 3B shows a subaddress conversion table according to a second embodiment of the present invention;

FIG. 4A shows a sample electronic mail message sent from a first repeater Internet facsimile machine to a second Internet facsimile machine in order to transmit image information received by the first repeater Internet facsimile machine;

FIG. 4B shows another sample electronic mail message sent from a first Internet facsimile machine to a second Internet facsimile machine in order to transmit image information received by the first Internet facsimile machine and destined to the second Internet facsimile machine;

FIG. 10 shows a sample electronic mail message of a multipart MIME type used to request a repeater operation;

FIGS. 11 and 12 are a flowchart showing a process executed by a first Internet facsimile machine receiving image information from an ordinary facsimile machine via the international PSTN for transmitting the received image information to a second Internet facsimile machine in the form of an electronic mail message as shown in FIG. 10;

FIG. 13A shows a sample telephone number conversion table according to a third embodiment of the present invention;

FIG. 13B shows a sample telephone number conversion table according to a fourth embodiment of the present invention;

FIG. 14 shows a sample electronic mail message according to the third embodiment;

FIG. 16 is a flowchart of a process executed by an Internet facsimile machine receiving the electronic mail message according to the third embodiment;

FIG. 17 shows a sample electronic mail message according to the fourth embodiment;

FIG. 20 shows a sample electronic mail message for reporting a result of facsimile transmission;

FIG. 22 shows a sample electronic mail message of a multipart MIME type used to request a repeater operation;

FIG. 23 is a flowchart showing a process executed by a first Internet facsimile machine for transmitting image information to a second Internet facsimile machine in the form of an electronic mail message as shown in FIG. 22;

FIG. 24 is a flowchart of a process executed by the second Internet facsimile machine receiving the electronic mail message as shown in FIG. 22;

FIGS. 26 and 27 are a flowchart showing another process executed by the Internet facsimile machine equipped to give the user an option of using the Internet and not using the Internet.

DESCRIPTION OF THE PREFERRED EMBODIMENTS

Figure 1:
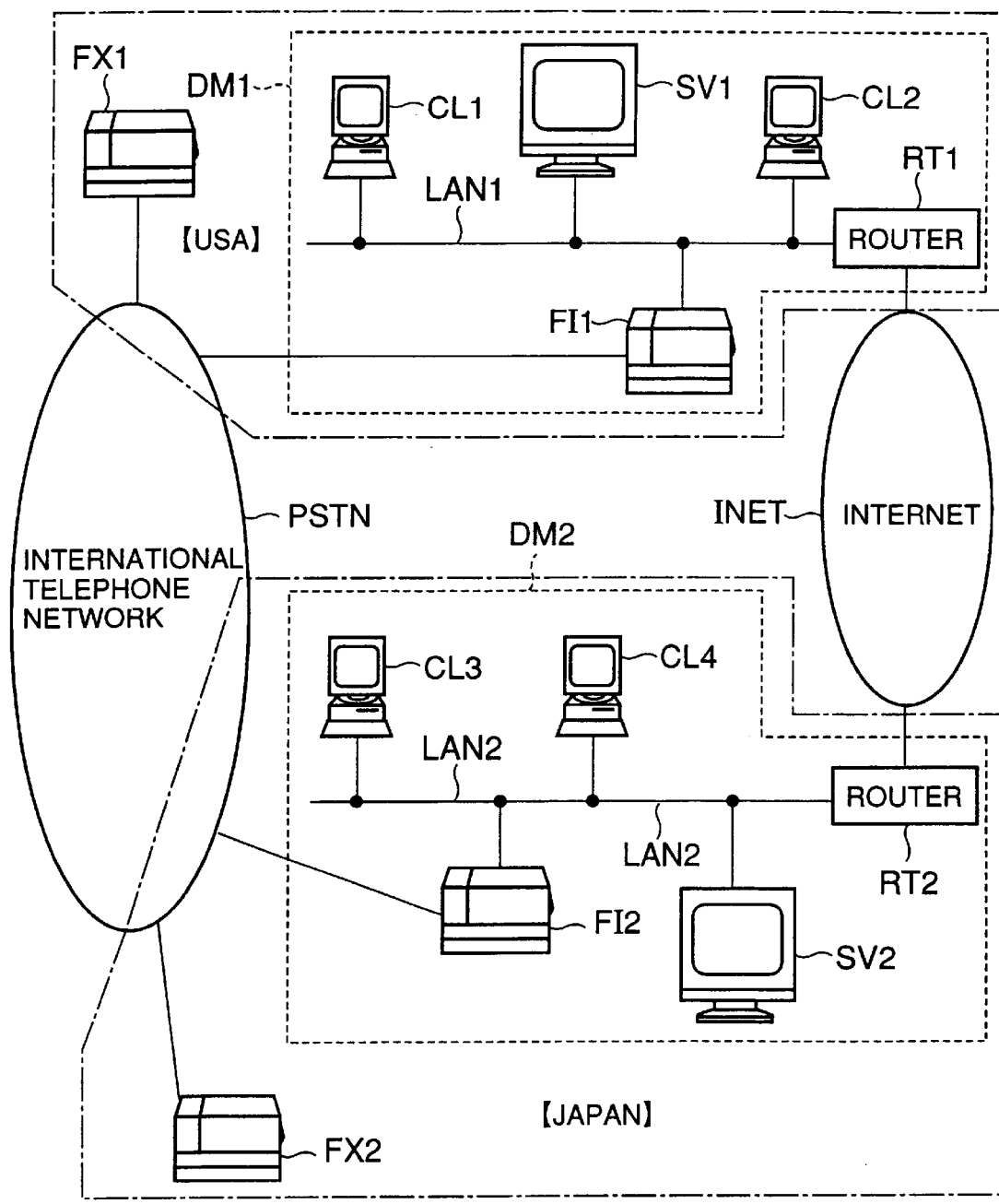
FIG. 1 shows a communication system according to the present invention.

FIG. 1 shows a communication system according to the present invention. Since the present invention generally presumes electronic mail as an application to be run on the Internet, description of the other applications is omitted in the rest of the specification.

Referring to FIG. 1, the communication system comprises a domain DM1 that includes a local network LAN1 installed in the United States and a domain DM2 that includes a local area network LAN2 installed in Japan. A facsimile machine FX1 is a Group 3 facsimile machine that uses the international public switched telephone network PSTN installed in the United States as a transmission line. A facsimile machine FX2 is a Group 3 facsimile machine which uses the international public switched telephone network PSTN in Japan as a transmission line.

Each of the domains DM1 and DM2 is connected to an Internet (INET) service provider (not shown) via a router RT1 and a router RT2, respectively, using a leased line.

Each of the domains DM1 and DM2 has a unique network address produced by applying a predetermined subnet mask to the network address assigned to the domains DM1 and DM2, respectively, so that the domains DM1 and DM2 can exchange data via the routers RT1 and RT2 over the Internet (INET).

The domain DM1 is provided with client terminals CL1 and CL2 connected to the local area network LAN1, an Internet facsimile machine FI1, and a mail server SV1 for providing electronic mail service to the client terminals CL1 and CL2, and the Internet facsimile machine FI1. A unique host address produced by joining the network address for the domain DM1 with a local address is assigned to each of the client terminals CL1 and CL2, the Internet facsimile machine FI1, and the mail server terminal SV1. A user using the domain DM1 is assigned a user address produced by joining a unique user address with the host address for the client terminal CL1 or CL2.

The domain DM2 is provided with client terminals CL3 and CL4 connected to the local area network LAN2, an Internet facsimile machine FI2, and a mail server SV2 for providing electronic mail service to the client terminals CL3 and CL4, and the Internet facsimile machine FI2. A unique host address produced by joining the network address for the domain DM2 with a local address is assigned to each of the client terminals CL3 and CL4, the Internet facsimile machine FI2, and the mail server terminal SV2. A user using the domain DM2 is assigned a user address produced by joining a unique user address with the host address for the client terminal CL3 or CL4.

Each of the Internet facsimile machines FI1 and FI2 is provided with a first transmission function for connecting to the local networks LAN1 and LAN2, respectively, and exchanging image information in the form of electronic mail, and a second transmission function for connecting to the international PSTN and transmitting image information over the international PSTN using the Group 3 facsimile transmission protocol.

Basically, a protocol suite comprising TCP/IP (the transfer protocol covering the transport layer) and communication protocols covering the upper layers is used to exchange data between terminals connected to the local area network LAN1 or LAN2 and to exchange data over the Internet (INET). For example, a communication protocol known as Simple Mail Transfer Protocol (SMTP) is used as an upper-layer protocol to exchange electronic mail data.

In the first embodiment, electronic mail messages are stored in the mail server terminal SV1 or SV2 before being delivered to respective destinations. When a destination address (described later) attached to an electronic mail message includes a network address for the domain DM1 or DM2, the electronic mail message is stored in the relevant mail server terminal SV1 or SV2. When the destination address attached to the electronic mail message includes a network address other than that for the domain DM1 or DM2, the electronic mail message is sent to the Internet (INET) via the router RT1 or RT2, whereupon the data transfer function of the Internet sends the electronic mail message to an appropriate domain or a host having the network address that corresponds to a value set in the destination address.

For example, an electronic mail message from a user in the domain DM1 to a user in the domain DM2 is stored in the mail server terminal SV1. The electronic mail stored in the mail server terminal SV1 is then sent to the Internet (INET) via the router RT1 so as to be transmitted to and stored in the mail server terminal SV2 in the destination domain DM2 via the Internet (INET).

Each of the terminals (the client terminals and the Internet facsimile machines) issues an inquiry at appropriate intervals to the mail server terminal SV1 or SV2 so as to learn whether there are any electronic mail messages destined to a user of the inquiring terminal. If the electronic mail message destined to a user of the inquiring terminal is stored in the mail server terminal SV1 or SV2, the inquiring terminal receives the electronic mail message from the mail server terminal SV1 or SV2 so as to notify the recipient user of the reception. The Internet facsimile machines FI1 and FI2 use an electronic mail address assigned thereto as a user address.

The Post Office Protocol (POP) is used by the terminals to ask for electronic mail messages from the mail server terminal SV1 or SV2.

Communication protocols such as TCP/IP, SMTP and POP, and data format and data construction of electronic mail are prescribed in Requests For Comments (RFC) issued by the Internet Engineering Task Force which governs the technology related to the Internet. For example, TCP is prescribed in RFC793, IP in RFC793, SMTP in RFC821 and the format of electronic mail in RFC822, RFC1341 AND RFC1342.

FIG. 2 shows a construction of the Internet facsimile machines FI1 and FI2.

Referring to FIG. 2, a system controller 1 controls the parts of the Internet facsimile machine and processes the facsimile transmission procedure and the like. A system memory 2 stores a control program executed by the system controller 1 and various data needed when the control program is executed. The system memory 2 also constitutes a work area for the system controller 1. A parameter memory 3 stores information assigned specifically to the Internet facsimile machine. A clock circuit 4 outputs a current time.

A scanner 5 reads an image of an original at a predetermined resolution. A plotter 6 records and outputs an image at a predetermined resolution. An operation and display part 7 allows a user to operate the Internet facsimile machine and comprises various operation keys and displays.

A coder/decoder 8 compresses an image signal by encoding it and decodes image information compressed by encoding to retrieve the original image signal. An image storage unit 9 stores a large volume of image information compressed by encoding.

A Group 3 facsimile modem 10 is provided to implement the Group 3 facsimile modem function and comprises a low-speed function (V. 21 modem) for exchanging a transmission procedure signal and a high-speed modem (V.17 modem, V.34 modem, V.29 modem and V. 27ter modem) for exchanging image information.

A network control unit 11 connects the Internet facsimile machine to the international PSTN and comprises an automatic transmission and reception function.

A local area network interface circuit 12 connects the Internet facsimile machine to a local area network. A local area network transmission controller 13 processes communication control in accordance with a predetermined protocol suite for exchanging data with other data terminals over the local area network or the Internet.

The system controller 1, the system memory 2, the parameter memory 3, the clock circuit 4, the scanner 5, the plotter 6, the operation and display part 7, the coder/decoder 8, the image storage unit 9, the Group 3 facsimile modem 10, the network control unit 11, and the local area network transmission controller 13 are connected to an internal bus 14. Exchange of data between these elements occurs over the internal bus 14.

The network control unit 11 and the Group 3 facsimile modem 10 directly exchange data with each other.

The parameter memory 3 of the Internet facsimile machines FI1 and FI2 stores a subaddress conversion table listing pairs of subaddress numbers received from the ordinary facsimile machine FX1 or FX2 and corresponding mail addresses of the Internet facsimile machines operated as a repeater for repeating image information to a destination terminal specified by the subaddress number. FIG. 3A shows a sample subaddress conversion table.

Telephone numbers for the final destination terminal are entered in the table as subaddresses. "001-43-1-ANY" represents any telephone number that starts with "001-43-" (namely, all the destination telephone numbers in Australia). The telephone numbers are assumed to be dialed in Japan.

A host name is chosen so that the corresponding mail address (which is equivalent to a user address of an Internet user) of the Internet facsimile machines can be easily recognized. The host name is converted into a corresponding IP address by a Domain Name System (DNS; see RFC1034 and RFC1035) server provided in each domain to manage a table that lists correspondence between host names and host addresses in the domain. In the first embodiment, it is assumed that the mail server terminals SV1 and SV2 also operates as a DNS for converting host names into IP addresses. Therefore, the host name-IP address conversion process is executed by the mail server terminals SV1 and SV2.

The subaddress is transmitted from a transmitting machine to a recipient machine using a subaddress signal of the Group 3 facsimile transmission procedure signals or a non-standard function setting signal NSS of the Group 3 facsimile transmission procedure signals.

FIG. 4A shows a sample electronic mail message sent from a first repeater Internet facsimile machine to a second repeater Internet facsimile machine in order to transmit image information received by the first repeater Internet facsimile machine from an ordinary facsimile machine.

An electronic mail message generally contains header information and a message body. The header information generally comprises a "Date" field in which a date and time of transmission is set, a "Message-ID" field in which information for identifying the electronic mail message is set, a "From" field for indicating an originator, a "To" field for indicating a destination address and a "Subject" field for indicating a title of the message. In the first embodiment, the "Subject" field is used as a field to report the telephone number of the transfer destination.

Referring to FIG. 4A, the date and time of transmission is "Tue, 23 Jul 1996 15:45:21+0900 (Japan Standard Time)", and the electronic mail message identification information is "<XXXXXXXXXXXXXX@jpnbox.**.co.jp>". The originator is "<NETFAX_JPN@jpnbox..co.jp>" in Japan and the destination address of the repeater machine (the second repeater machine) is "<NETFAX_USA@usabox.**.co.jp>" in the USA. The subaddress (that is, the telephone number) of the final destination machine is 0201-603-xxx.

It is called for that the message body of the electronic mail message is readable information constructed of 7-bit codes. Since image information to be transmitted is binary data, it cannot be sent directly. Therefore, as shown in FIG. 4A, the image information is converted into information that conforms to the format of the Multipurpose Internet Mail Extensions (MIME; RFC1341, RFC1342).

The message body according to the first embodiment includes a "Mime-Version field" (in which the version number 1.0 is universally set) indicating that the message is of a MIME type, a "Content-Transfer-Encoding" field in which the type of encoding is indicated (the example in FIG. 4A shows that the base64 encoding is used), and MIME information produced by subjecting the image information to the base64 encoding.

Figure 5:
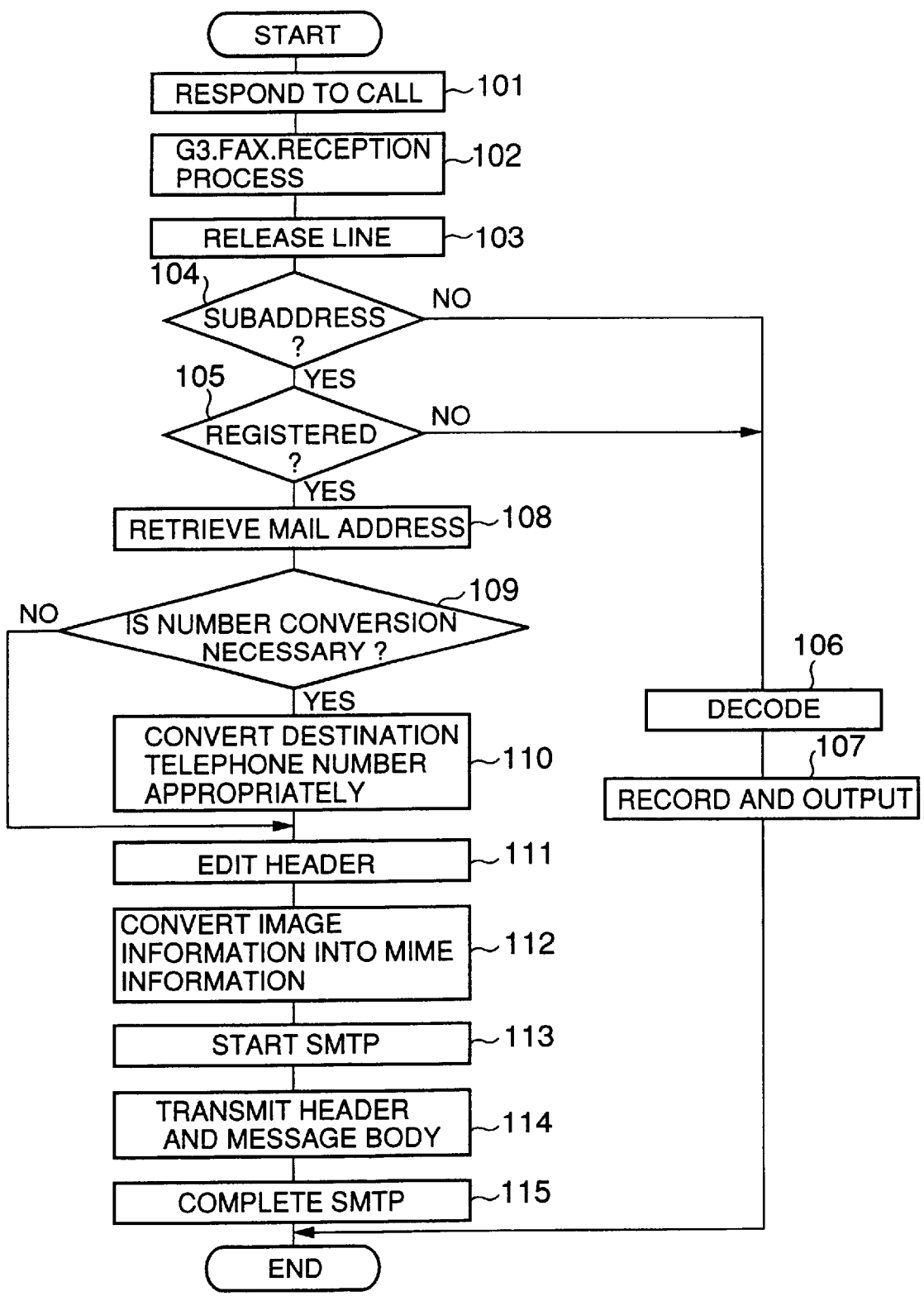
FIG. 5 is a flowchart according to the first embodiment showing a process executed by the first repeater Internet facsimile machine for transmitting image information received from an ordinary facsimile machine via the international PSTN to the second repeater Internet facsimile machine.

FIG. 5 is a flowchart showing a process executed by the first repeater Internet facsimile machine for transmitting image information received from the ordinary facsimile machine via the international PSTN to the second repeater Internet facsimile machine.

Upon receiving a call via the international PSTN, the Internet facsimile machine (the first repeater Internet facsimile machine) responds to the call (step 101) and executes the predetermined Group 3 facsimile reception process (step 102) so as to receive image information from the originating machine and store the received image information in the image storage unit 9. Various information (subaddress information, transmitting machine identification information, attribute information, such as linear density and encoding type, relating to the image) which are received according to the transmission procedure are also stored. When the Group 3 reception process is completed, the international PSTN is released (step 103).

A determination is made as to whether the subaddress information is received (step 104). If an affirmative answer is yielded in step 104, a determination is made as to whether the received subaddress is registered in the subaddress conversion table (step 105).

If a negative answer is yielded in step 104 or if a negative answer is yielded in step 105, the image information received and stored in the image storage unit 9 is decoded by the coder/decoder 8 so as to reproduce original image data (step 106). The image data is transferred to the plotter 6 so as to record and output the received image (step 107), thus concluding the operation.

If the received subaddress is registered in the subaddress conversion table, that is, if an affirmative answer is yielded in step 105, the corresponding mail address in the subaddress conversion table corresponding to the subaddress is retrieved (step 108).

A determination is then made as to whether the destination telephone number specified by the subaddress is to be converted into a domestic telephone number for the second repeater Internet facsimile machine (step 109). If an affirmative answer is yielded in step 109, the destination telephone number specified by the subaddress information is converted into a corresponding domestic telephone number (step 110).

The header information is then edited (step 111). Subsequently, the image information stored in the image storage unit 9 is base64 encoded so as to produce MIME information (step 112).

A predetermined SMTP procedure is started (step 113) so that the header information and the message body (MIME information) are successively sent to the local area network (step 114). The SMTP is completed (step 115), thus concluding the operation of the Internet facsimile machine (the first repeater Internet facsimile machine).

Figure 6:
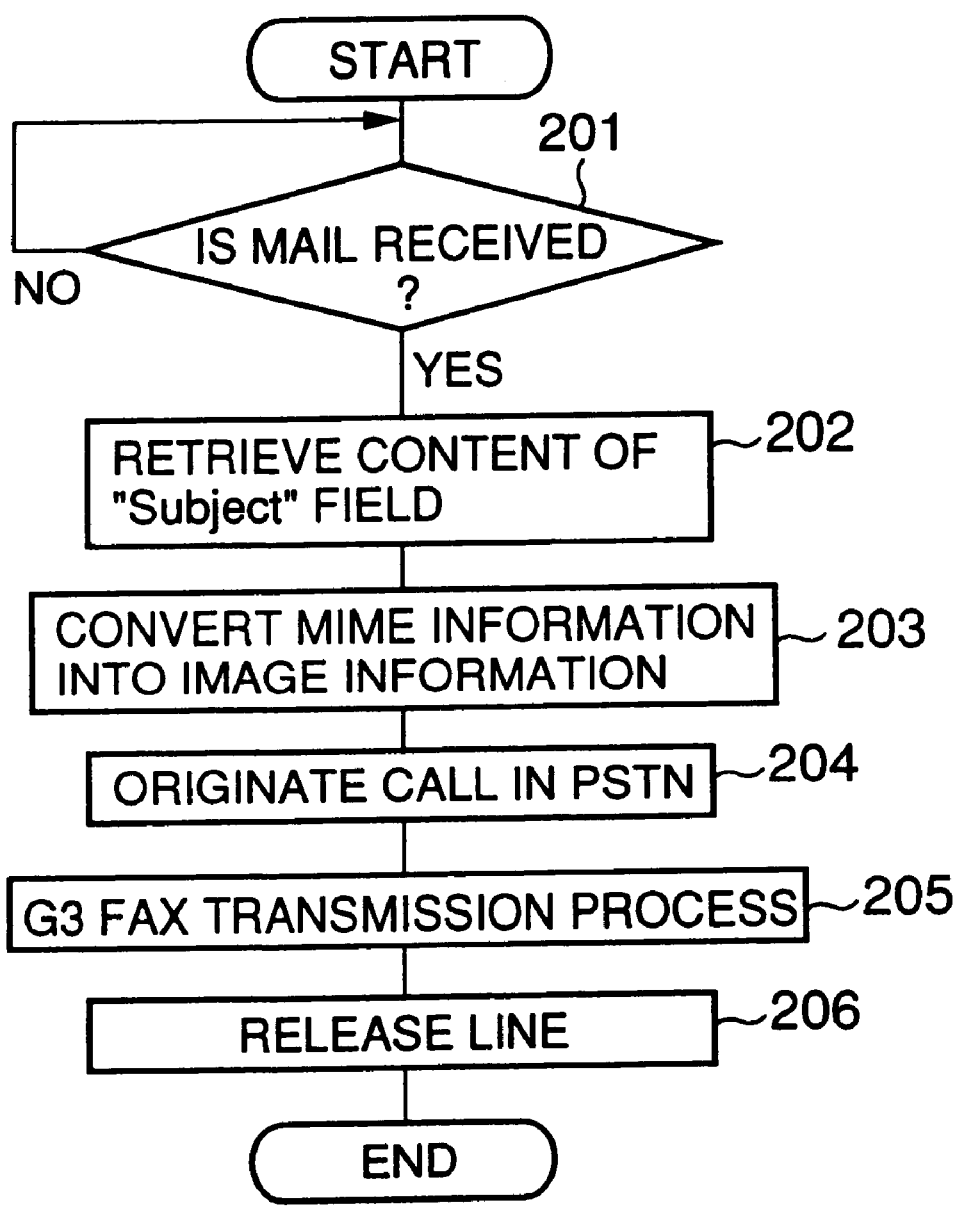
FIG. 6 is a flowchart according to the first embodiment showing a process executed by the second repeater Internet facsimile machine receiving an electronic mail message.

FIG. 6 is a flowchart showing a process executed by the Internet facsimile machine (the second repeater Internet facsimile machine) receiving an electronic mail message.

When an electronic mail message is received (YES in step 201), the content of the "Subject" field is retrieved as a telephone number for the destination (step 202). The MIME information of the message body is subject to reverse base64 encoding so as to reproduce image data (step 203). The Internet facsimile machine then originates a call via the international PSTN by dialing the telephone number of the destination retrieved in step 202 (step 204) and then executes a predetermined Group 3 facsimile transmission process so as to transmit the reproduced image data to the destination (step 205). After the Group 3 facsimile transmission process is completed, the Internet facsimile machine releases the international PSTN (step 206).

As described above, the first embodiment reduces the communication cost significantly for image information transmission from a facsimile machine connected to the international PSTN to an overseas destination by causing the first repeater Internet facsimile machine installed in the same country as the transmitting machine to perform a repeater operation for transferring the image information to the second repeater Internet facsimile machine installed in the same country as the recipient machine. The cost is reduced because no additional communication charge is incurred for the image information transfer between the repeater Internet facsimile machines.

While it is assumed in the above description that the Internet facsimile machine repeats the image information destined to the machine provided overseas. The Internet facsimile machines may also perform the repeater operation when the image information is destined to a remote domestic machine.

In the first embodiment, it is assumed that an ordinary facsimile machine connected to the international PSTN sends image information to another ordinary facsimile machine connected to the international-PSTN using the repeater operation provided by the Internet facsimile machines installed close to the respective ordinary facsimile machines. According to the first embodiment, it is impossible to specify a remote Internet facsimile machine as a final destination.

A description will now be given of a second embodiment of the present invention which enables specifying either of an Internet facsimile machine and an ordinary facsimile machine connected to the international PSTN.

FIG. 3B shows a sample subaddress conversion table according to the second embodiment listing pairs of subaddress numbers received from the ordinary facsimile machine FX1 or FX2 and corresponding mail addresses of the Internet facsimile machines operated as a repeater for repeating image information to a destination terminal specified by the subaddress number, or listing subaddress numbers and corresponding mail addresses of the Internet facsimile machines designated as a final destination.

Subaddress numbers may be telephone number of the final destination connected to the international PSTN, or numbers of arbitrary figures ("001", "002" or the like) that specify the Internet facsimile machine designated as a final destination and correspond to subaddresses in the network.

Similarly to the subaddress conversion table of FIG. 3B, a host name is chosen so that the corresponding mail addresses of the Internet facsimile machines can be easily recognized. Conversion of the host name into the IP address is performed using the same method as described in the first embodiment.

According to the second embodiment, when a first Internet facsimile machine receiving image information from an ordinary facsimile machine uses a repeater operation of a second Internet facsimile machine so as to send the image information to a destination, the electronic from the first Internet machine to the second Internet facsimile machine has the format as shown in FIG. 4A.

When a first Internet facsimile machine receives image information destined to a second Internet facsimile machine from an ordinary facsimile machine, the electronic mail message from the first Internet facsimile machine to the second Internet facsimile machine has the format as shown in FIG. 4B. That is, a predetermined value "000" is set in the "Subject" field of the header information.

The Internet facsimile machine receiving an electronic mail message in which "000" is set in the "Subject" field learns that this-machine is the final destination and records and outputs the image contained in the electronic mail message.

Figure 7:
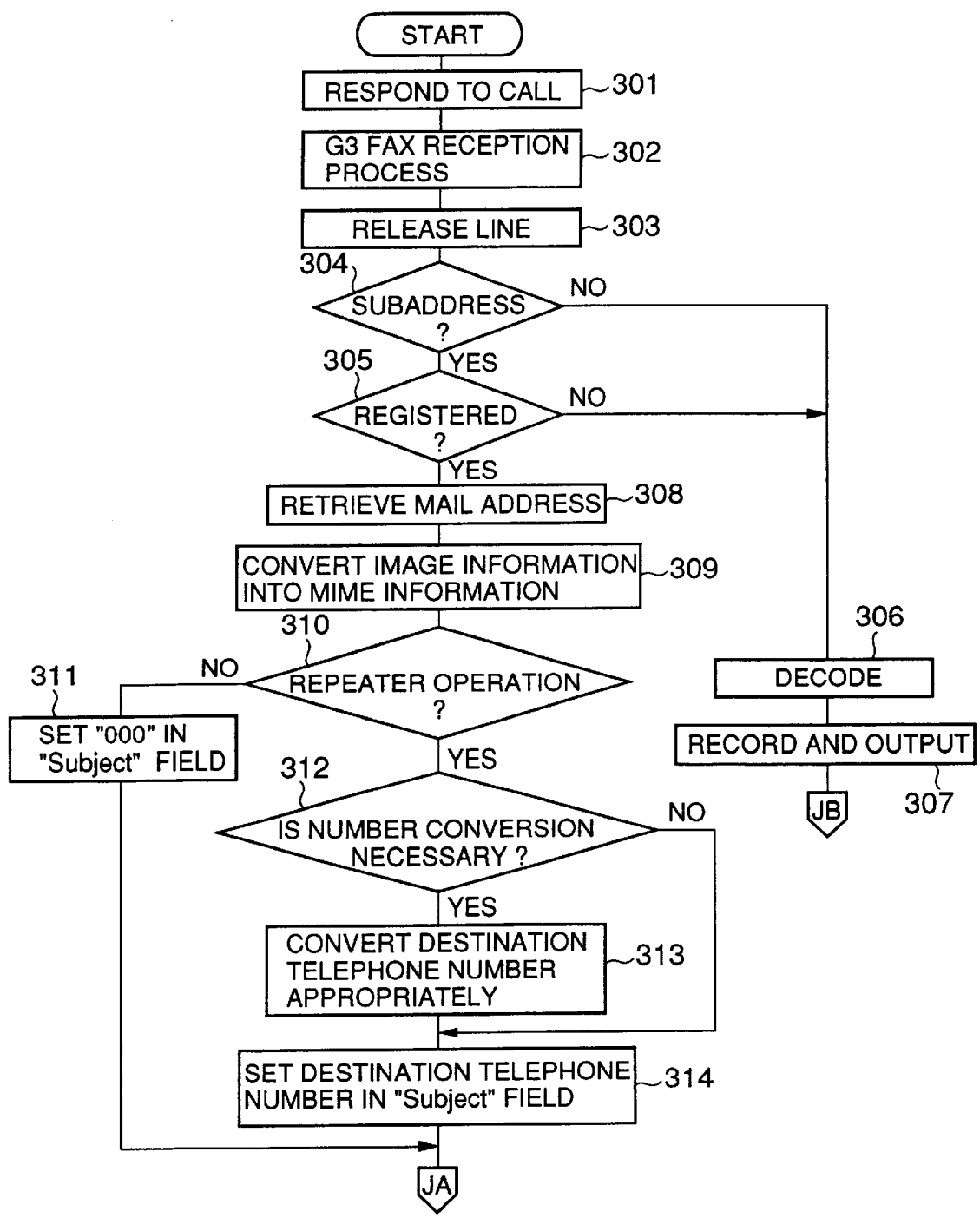
FIGS. 7 and 8 are a flowchart according to the second embodiment showing a process executed by a first Internet facsimile machine for transmitting image information received from an ordinary facsimile machine via the international PSTN to a second Internet facsimile machine.
Figure 8:
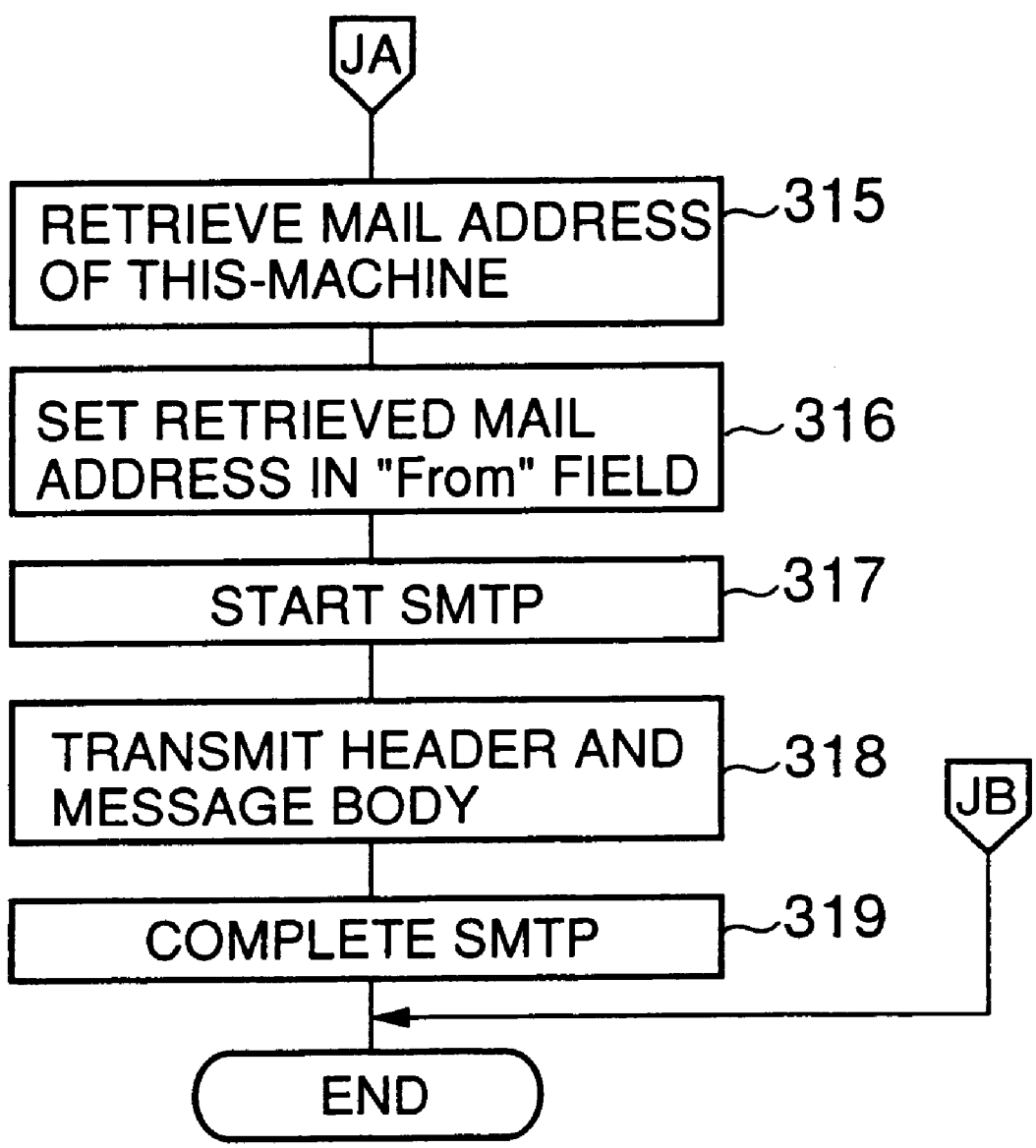

FIGS. 7 and 8 are a flowchart according to the second embodiment showing a process executed by a first Internet facsimile machine for transmitting image information received from an ordinary facsimile machine via the international PSTN to a second Internet facsimile machine.

Upon receiving a call via the international PSTN, the first Internet facsimile machine responds to the call (step 301) and executes the predetermined Group 3 facsimile reception process (step 302) so as to receive image information from the originating machine and store the received image information in the image storage unit 9. Various information (subaddress information, transmitting machine identification information, attribute information, such as linear density and encoding type, relating to the image) which are received according to the transmission procedure are also stored. When the Group 3 reception process is completed, the international PSTN is released (step 103).

A determination is made as to whether the subaddress information is received (step 304). If an affirmative answer is yielded in step 304, a determination is made as to whether the received subaddress is registered in the subaddress conversion table (step 305).

If a negative answer is yielded in step 304 or if a negative answer is yielded in step 305, the image information received and stored in the image storage unit 9 is decoded by the coder/decoder 8 so as to reproduce-original image data (step 306). The image data is transferred to the plotter 6 so as to record and output the received image (step 307), thus concluding the operation.

If the received subaddress is registered in the subaddress conversion table, that is, if an affirmative answer is yielded in step 305, the corresponding mail address in the subaddress conversion table corresponding to the subaddress is retrieved (step 308). Subsequently, the image information stored in the image storage unit 9 is base64 encoded so as to produce MIME information (step 309).

The subaddress is examined so as to determine whether the electronic mail message requires a repeater operation (step 310). If a negative answer is yielded in step 310, the predetermined value "000" is set in the "Subject" field (step 311).

If the electronic mail requires a repeater operation, that is, if an affirmative answer is yielded in step 310, a determination is then made as to whether the destination telephone number specified by the subaddress is to be converted into a domestic telephone number for the second Internet facsimile machine (step 312). If an affirmative answer is yielded in step 312, the destination telephone number specified by the subaddress information is converted into a corresponding domestic telephone number (step 313). The destination telephone number or the domestic telephone number obtained by conversion is set in the "Subject" field (step 314).

The first Internet facsimile machine then retrieves a mail address (user address) of itself (step 315) and sets the retrieved address in the "From" field (step 316).

A predetermined SMTP procedure is started (step 317) so that the header information and the message body (MIME information) are successively sent to the local area network (step 318). The SMTP is completed (step 319), thus concluding the operation of the first Internet facsimile machine.

Figure 9:
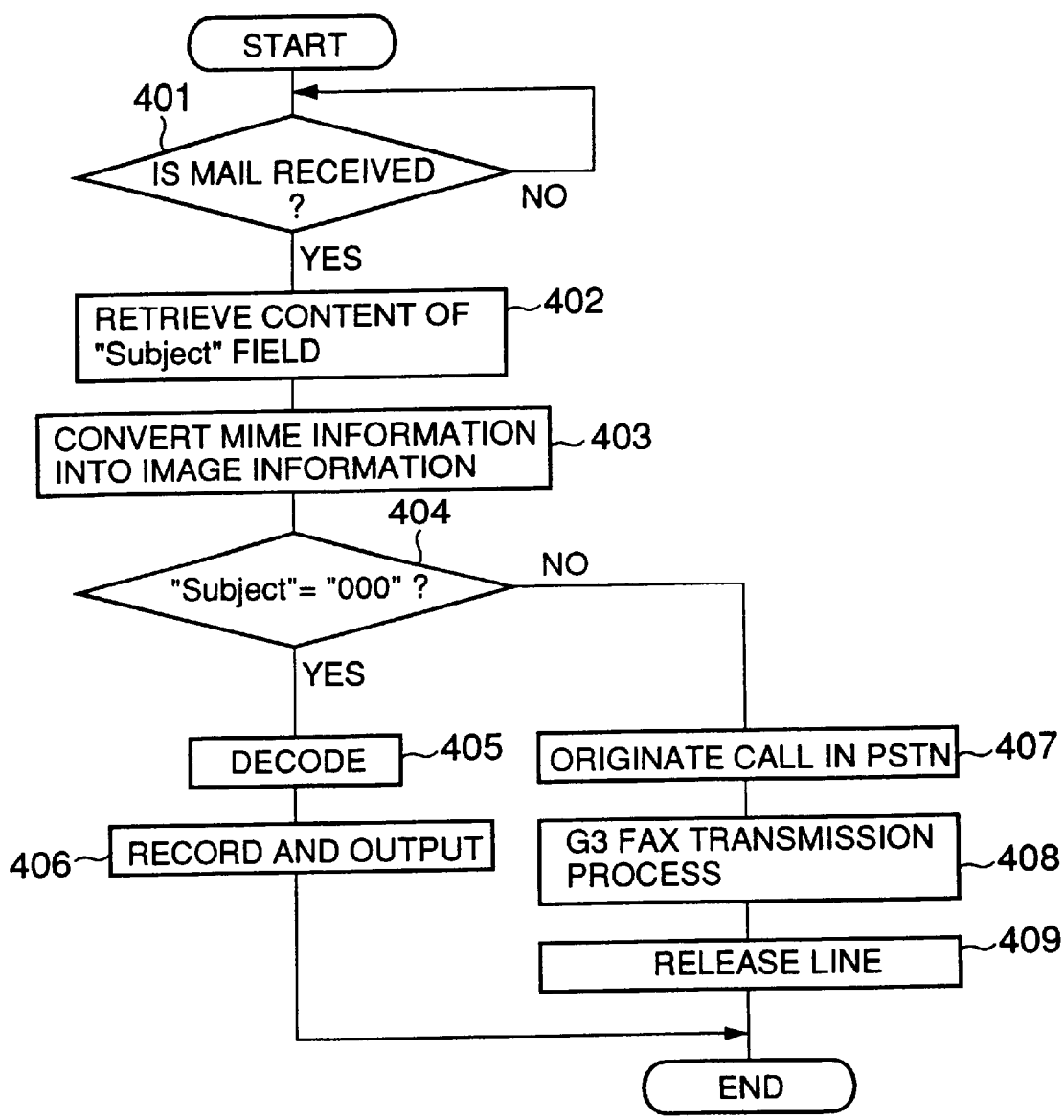
FIG. 9 is a flowchart according to the second embodiment showing a process executed by the second Internet facsimile machine receiving an electronic mail message from the first International facsimile machine.

FIG. 9 is a flowchart according to the second embodiment showing a process executed by the second Internet facsimile machine receiving an electronic mail message from the first International facsimile machine.

When an electronic mail message is received (YES in step 401), the content of the "Subject" field is retrieved (step 402) and the MIME information of the message body is subject to reverse base64 encoding so as to reproduce image data (step 403).

The "Subject" field is examined to determine whether "000" is set therein (step 404). If an affirmative answer is yielded in step 404, the image data is decoded by the coder/decoder 8 so as to reproduce the original image data (step 405). The reproduced image data is transferred to the plotter 6 so as to record and output the received image (step 406).

When "000" is not set in the "Subject" field, that is, when a negative answer is yielded in step 404, the second Internet facsimile machine originates a call via the international PSTN by dialing the telephone number of the destination retrieved in step 402 (step 407) and then executes a predetermined Group 3 facsimile transmission process so as to transmit the reproduced image data to the destination (step 408).

After the transmission is completed, the second Internet facsimile machine releases the international PSTN (step 409), thus concluding the image information transmission operation.

As described above, the second embodiment reduces the communication cost significantly for image information transmission from a facsimile machine connected to the international PSTN to an overseas destination by causing the first Internet facsimile machine installed in the same country as the transmitting machine to perform a repeater operation for transferring the image information to the second Internet facsimile machine installed in the same country as the recipient machine. The cost is reduced because no additional communication charge is incurred for the image information transfer between the first and second Internet facsimile machines.

The second embodiment also enables a facsimile machine connected to the international PSTN to request a repeater operation, designating any Internet facsimile machine as a final destination. Thus, flexibility of the Internet facsimile machine is significantly improved.

In the first and second embodiments described above, the image information transmitted in the form of electronic mail is of a non-multipart MIME type. The "Subject" field of the header information is used to carry the destination telephone number. However, more detailed information can be sent using electronic mail of a multipart MIME type.

FIG. 10 shows a sample electronic mail message of a multipart MIME type used to request a repeater operation. The electronic mail message of FIG. 10 is of basically the same MIME type as the message shown in FIGS. 4A and 4B. Therefore, description for like sections in the electronic mail message is omitted. When a repeater operation is not requested, that is, when the recipient of the electronic mail message is designated as the final destination, the electronic mail message as shown in FIG. 4B (in which "000" is set in the "Subject" field is set) is used.

As shown in FIG. 10, when the electronic mail message is used to request a repeater operation, a description "message transfer" is entered in the "Subject" field of the header information so as to indicate to the recipient of the message that the image information is to be forwarded.

The message body comprises a "MIME-Version" field for indicating that the message body is of a MIME type, a "Content-Type" field for indicating that the message is of a multipart type, a "boundary" field for indicating an essential part of a character string for delimiting different parts of the message, and data for the respective parts.

A "transfer to" subfield in which the destination telephone number (domestic number) is set is provided at the head of the MIME information so as to indicate the destination of the repeater operation.

MIME information derived from image information by base64 encoding is set in the next part of the MIME information. A "name" subfield is attached to the "Content-Type" field so as to indicate a file name of the transmitted image information.

Figure 11:
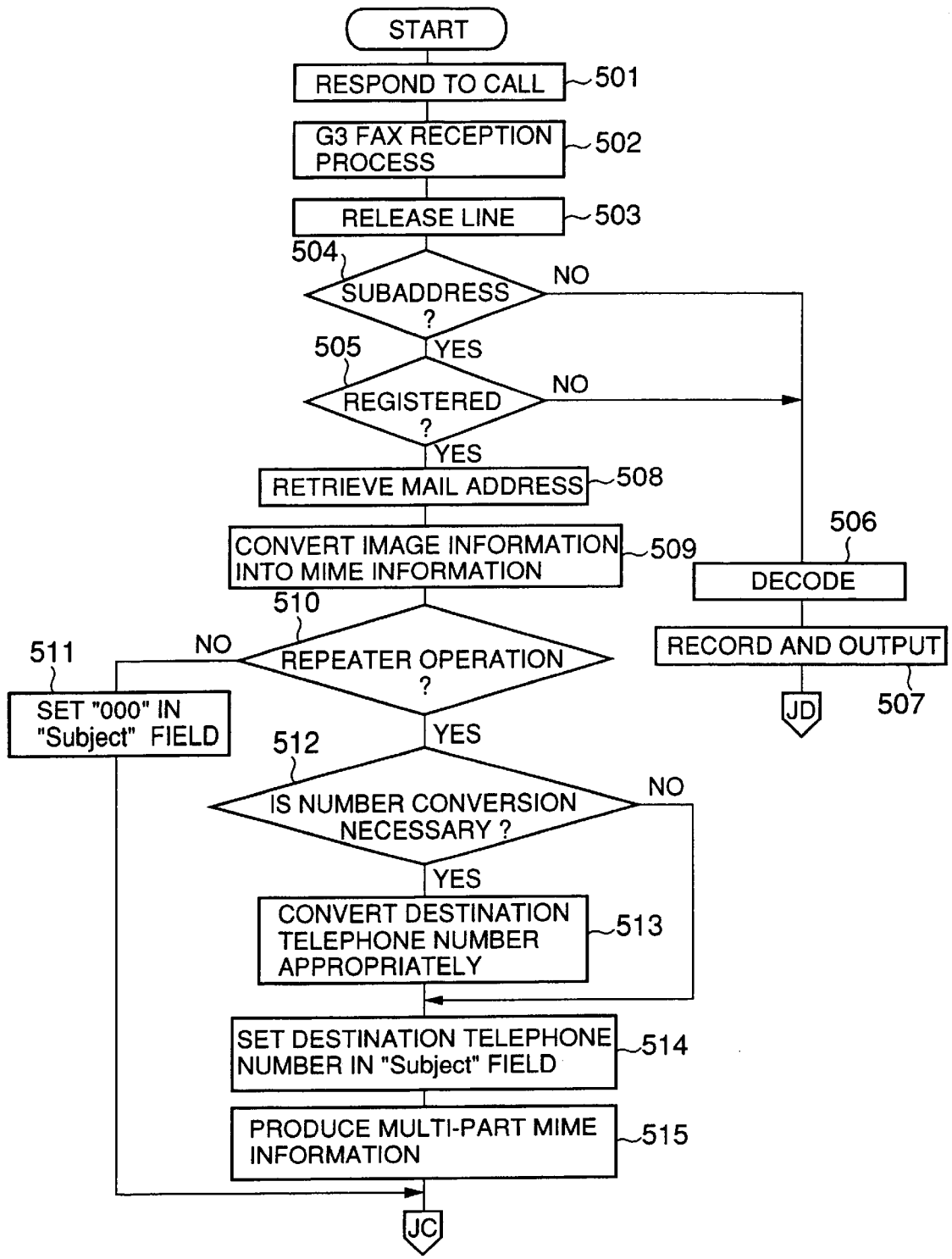

FIGS. 11 and 12 are a flowchart showing a process executed by a first Internet facsimile machine receiving image information from an ordinary facsimile machine via the international PSTN for transmitting the received image information to a second Internet facsimile machine in the form of an electronic mail message as shown in FIG. 10.

Upon receiving a call via the international PSTN, the first Internet facsimile machine responds to the call (step 501) and executes the predetermined Group 3 facsimile reception process (step 502) so as to receive image information from the originating machine and store the received image information in the image storage unit 9. Various information (subaddress information, transmitting machine identification information, attribute information, such as linear density and encoding type, relating to the image) which are received according to the transmission procedure are also stored. When the Group 3 reception process is completed, the international PSTN is released (step 503).

A determination is made as to whether the subaddress information is received (step 504). If an affirmative answer is yielded in step 504, a determination is made as to whether the received subaddress is registered in the subaddress conversion table (step 505).

If a negative answer is yielded in step 504 or if a negative answer is yielded in step 505, the image information received and stored in the image storage unit 9 is decoded by the coder/decoder 8 so as to reproduce original image data (step 506). The image data is transferred to the plotter 6 so as to record and output the received image (step 507), thus concluding the operation.

If the received subaddress is registered in the subaddress conversion table, that is, if an affirmative answer is yielded in step 505, the corresponding mail address in the subaddress conversion table corresponding to the subaddress is retrieved (step 508). Subsequently, the image information stored in the image storage unit 9 is base64 encoded so as to produce MIME information (step 509).

The subaddress is examined so as to determine whether the electronic mail message requires a repeater operation (step 510). If a negative answer is yielded in step 510, the predetermined value "000" is set in the "Subject" field (step 511).

If the electronic mail requires a repeater operation, that is, if an affirmative answer is yielded in step 510, a determination is then made as to whether the destination telephone number specified by the subaddress is to be converted into a domestic telephone number for the second Internet facsimile machine (step 512). If an affirmative answer is yielded in step 512, the destination telephone number specified by the subaddress information is converted into a corresponding domestic telephone number (step 513). The destination telephone number or the domestic telephone number obtained by conversion is set in the "Subject" field (step 514). Subsequently, the multipart MIME information constituting the message body is formed as described above (step 515).

The first Internet facsimile machine then retrieves a mail address (user address) of itself (step 516) and sets the retrieved address in the "From" field (step 517).

A predetermined SMTP procedure is started (step 518) so that the header information and the message body (MIME information) are successively sent to the local area network (step 519). The SMTP is completed (step 520), thus concluding the image transmission operation.

The operation of the second Internet facsimile machine receiving the electronic mail message is the same as the operation of FIG. 9 according to the second embodiment, a difference being that the telephone number dialed to call the destination is retrieved from the "transfer to" subfield in the MIME information, according to the operation using the electronic mail message as shown in FIG. 10.

A description will now be given of Internet facsimile machines assumed to be directly operated by a user for facsimile transmission rather than receiving a call from an ordinary facsimile machine.

FIG. 13A shows a sample telephone number conversion table stored in the parameter memory 3 of the Internet facsimile machines FI1 and FI2 according to the third embodiment. The telephone number conversion table stores telephone numbers to be referred to in connecting to the Internet facsimile machine via the international PSTN and mail addresses to be referred to in connecting to the Internet facsimile machine via the local area network LAN1 or LAN2 and over the Internet, in such a way as to relate each of the telephone numbers to the corresponding mail address.

When the Internet facsimile machine according to the third embodiment is operated by a user for transmission, the Internet facsimile machine determines whether or not the destination telephone number input by the user operation is an international number. If it is found that the input number is an international number, the telephone number conversion table is referred to in order to determine whether the input destination telephone number is registered.

If the input destination telephone number is not registered in the telephone number conversion table, the network control unit 11 is prompted to dial the destination telephone number. Image information of an original set in the scanner 5 is sent to the destination terminal by executing the predetermined Group 3 facsimile transmission procedure.

If the input destination telephone number is registered in the telephone number conversion table, the corresponding mail address is retrieved. An electronic mail message is then produced, wherein the retrieved mail address is set as a destination address and image information of an original set in the scanner 5 is set as message body data. The electronic mail message thus produced is then sent to the mail server in the local area network via the local area network transmission controller 13 and the local area network interface circuit 12.

FIG. 14 shows a sample electronic mail message according to the third embodiment.

Referring to FIG. 14, the date and time of transmission is "Tue, 23 Jul 1996 15:45:21+0900 (Japan Standard Time)", and the electronic mail message identification information is "<XXXXXXXXXXXXXX@jpnbox.**.co.jp>". The originator is "<Marketing_DIV1<NETFAX_JPN" in Japan and the destination address is "<NETFAX_USA@usabox.**.co.jp>" in the USA.

In the "From" field of the electronic mail message according to the third embodiment, the content of the transmitting machine identification (TSI) information "Marketing_DIV" set in the transmitting Internet facsimile machine is added to precede the mail address (user address) "NETFAX_JPN@jpnbox.****.co.jp>" of the transmitting Internet facsimile machine. With this, the recipient can obtain identification information other than the mail address of the originator.

Figure 15:
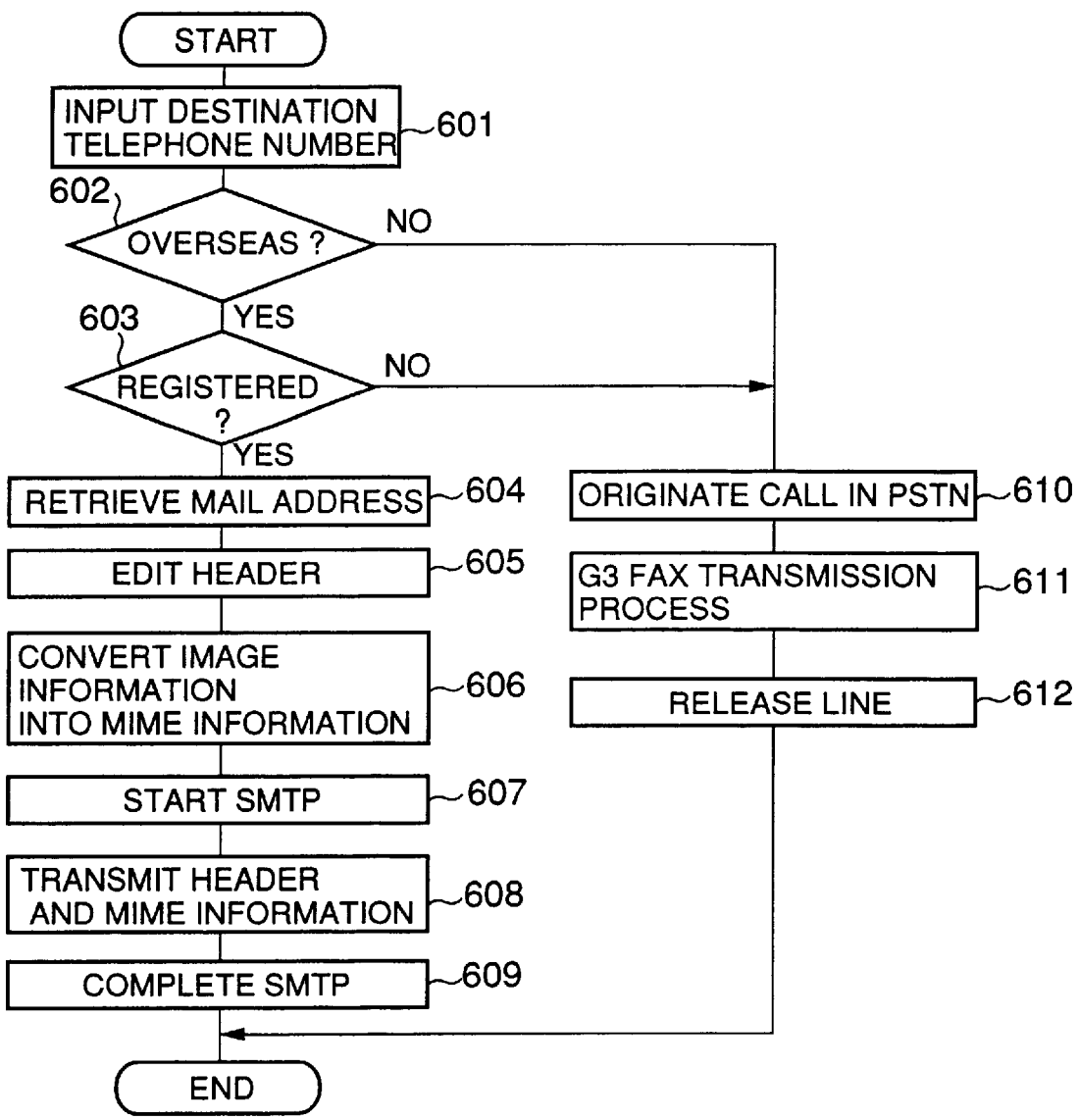
FIG. 15 is a flowchart showing a process executed by an Internet facsimile machine operated for facsimile transmission according to the third embodiment.

FIG. 15 is a flowchart showing a process executed by an Internet facsimile machines FI1 and FI2 operated for facsimile transmission according to the third embodiment.

When the Internet facsimile machine is fed an input of a destination telephone number by a user operation for transmission (step 601), a determination is made as to whether the destination telephone number is a domestic number or an international number (step 602). The determination in step 602 is made by determining whether a number dialed to call an international telephone service (for example "001" in KDD of Japan) is found at the head of the destination telephone number.

If an affirmative answer is yielded in step 602, a determination is then made as to whether the input telephone number is registered in the telephone number conversion table (step 603). If an affirmative answer is yielded in step 603, it is found that the destination terminal is an Internet facsimile machine. In this case, the corresponding mail address is retrieved (step 604) and the header is edited as described above (step 605). Image data produced by reading an original set in the scanner 5 is encoded for compression by the coder/decoder 8. The resultant image information is subject to the base64 encoding so as to produce MIME information (step 605).

A predetermined SMTP procedure is then started (step 607). The header information and the message body (MIME information) are successively sent to the local area network (step 608). The SMTP procedure is completed (step 609), thus concluding the image information transmission operation using the electronic mail message.

If the input telephone number is a domestic number, that is, if a negative answer is yielded in step 602, or if the input telephone number is an international number but is not registered in the telephone number conversion table, that is, if a negative answer is yielded in step 603, a call is originated in the international PSTN using the input telephone number (step 610). A predetermined Group 3 facsimile transmission process is executed so as to transmit the image information of the original set in the scanner 5 (step 611).

When the image information has been transmitted, the line is released (step 612), thus concluding the image information transmission operation.

FIG. 16 is a flowchart of a process executed by an Internet facsimile machine receiving the electronic mail message according to the third embodiment.

Upon receiving the electronic mail message (YES in step 701), the Internet facsimile machine subjects the MIME information in the message body to reverse base64 encoding so as to reproduce image information (step 702). The image information is decoded by the coder/decoder 8 into original image data (step 703). The resultant image data is transferred to the plotter 6 so as to record and output the received image (step 704).

Thus, the third embodiment enables a user to send image information destined to an Internet facsimile machine at a reduced cost since no additional communication charge is incurred by using the Internet (INET).

While the above description of the third embodiment assumes the use of the Internet for transmission to an overseas Internet facsimile machine, the Internet may also be used for transmission to a domestic Internet facsimile machine installed at a remote location.

Referring to FIG. 1, the Internet facsimile machine FI2 in Japan may use the international PSTN to transmit image information to the facsimile machine FX1 in the USA. However, because of the international communication charge, a higher cost is required for such transmission than when the image information is transmitted to the Internet facsimile machine FI1 installed in the USA.

A description will now be given of a fourth embodiment of the present invention.

In the fourth embodiment, an Internet facsimile machine close to the destination is used as a repeater. For example, by using the Internet facsimile machine FI1 in the USA as a repeater for image information transmission from the Internet facsimile machine FI2 in Japan to the facsimile machine FX1 in the USA, the only additional communication charge required for the transmission is the domestic charge between the Internet facsimile machine FI1 in the USA and the facsimile machine FX1 also in the USA. Therefore, the communication cost is significantly reduced.

FIG. 13B shows a sample telephone number conversion table used for such a repeater operation according to the fourth embodiment.

The "facsimile number" entries are destination telephone numbers and the like, and the "corresponding mail address" entries are addresses of the Internet facsimile machines operated as a repeater. An "NETFAX-Flag" entry indicates whether the terminal associated with the facsimile number is an Internet facsimile machine. A "transfer destination facsimile number" entry indicates a telephone number of a final destination facsimile machine served by the repeater terminal associated with the facsimile number.

For example, when the destination telephone number "001-1-201-673-XXXX" is input, the image information is sent to the corresponding mail address in the form of an electronic mail message.

When the destination telephone number "001-1-201-673-YYYY" is input, an electronic mail message requesting a repeater operation for forwarding the image information to "001-1-201-673-YYYY" is sent to the Internet facsimile machine having the corresponding mail address. In this case, since the input telephone number is an international number, the transfer destination is specified by converting the input number into a domestic telephone number for the repeater terminal. In this case, the telephone number of the transfer destination is 0201-673-YYYY after conversion.

"001-43-1-ANY" represents any telephone number that starts with "001-43-" (namely, all the destination telephone numbers in Australia). When the telephone number "001-43-1-797-11-3425" is input, an electronic mail message requesting for a repeater operation is transmitted to the corresponding mail address "NETFAX_AST@astbox.****.co.jp". The telephone number of the transfer destination is "01-797-11-3425" after conversion.

"*01" is referred to when the abbreviated number "01" is specified. In this case, an electronic mail message requesting a repeater operation is sent to the corresponding mail address "NETFAX_FRA@frabox.****.co.jp". The telephone number of the transfer destination is "99-84-XXXX".

For an abbreviated number "*02", the NETFAX-Flag is set to OFF. This means that the corresponding mail address is assigned to a user or a terminal other than an Internet facsimile machine.

When an abbreviated number "*03" is input, the image information is sent to the corresponding mail address "NETFAX_FRA@frabox.****.co.jp" in the form of an electronic mail message.

FIG. 17 shows a sample electronic mail message according to the fourth embodiment.

The message of FIG. 17 has basically the same format as the message of FIG. 14 in that both of the messages are of a MIME type. Therefore, description of those elements of the message of FIG. 17 that are the same as the corresponding elements shown in FIG. 14 is omitted.

If the electronic mail message is for requesting a repeater operation, the telephone number of the transfer destination is set in the "Subject" field of the header information. The "Subject" is normally intended to be used to display a title or the like of a message body.

If the electronic mail message is not for requesting a repeater operation, that is, if the destination of the electronic mail message is a final recipient of the image information (for example, when "*03" is specified by a user operation), a predetermined value "000" is set in the "Subject" field. Any predetermined value can be used as long as it can be distinguished appropriately.

Accordingly, the Internet facsimile machine receiving the electronic mail message according to the fourth embodiment examines the content of the "Subject" field in the header. If "000" is found, the Internet facsimile machine recognizes that this-machine is a recipient of the image information so as to record and output the received image.

If the "Subject" field contains a value other than "000", the MIME information in the received electronic mail message is converted into image information. A call is originated to the destination telephone number specified in the "Subject" field so as to transmit the image information to the destination.

Figure 18:
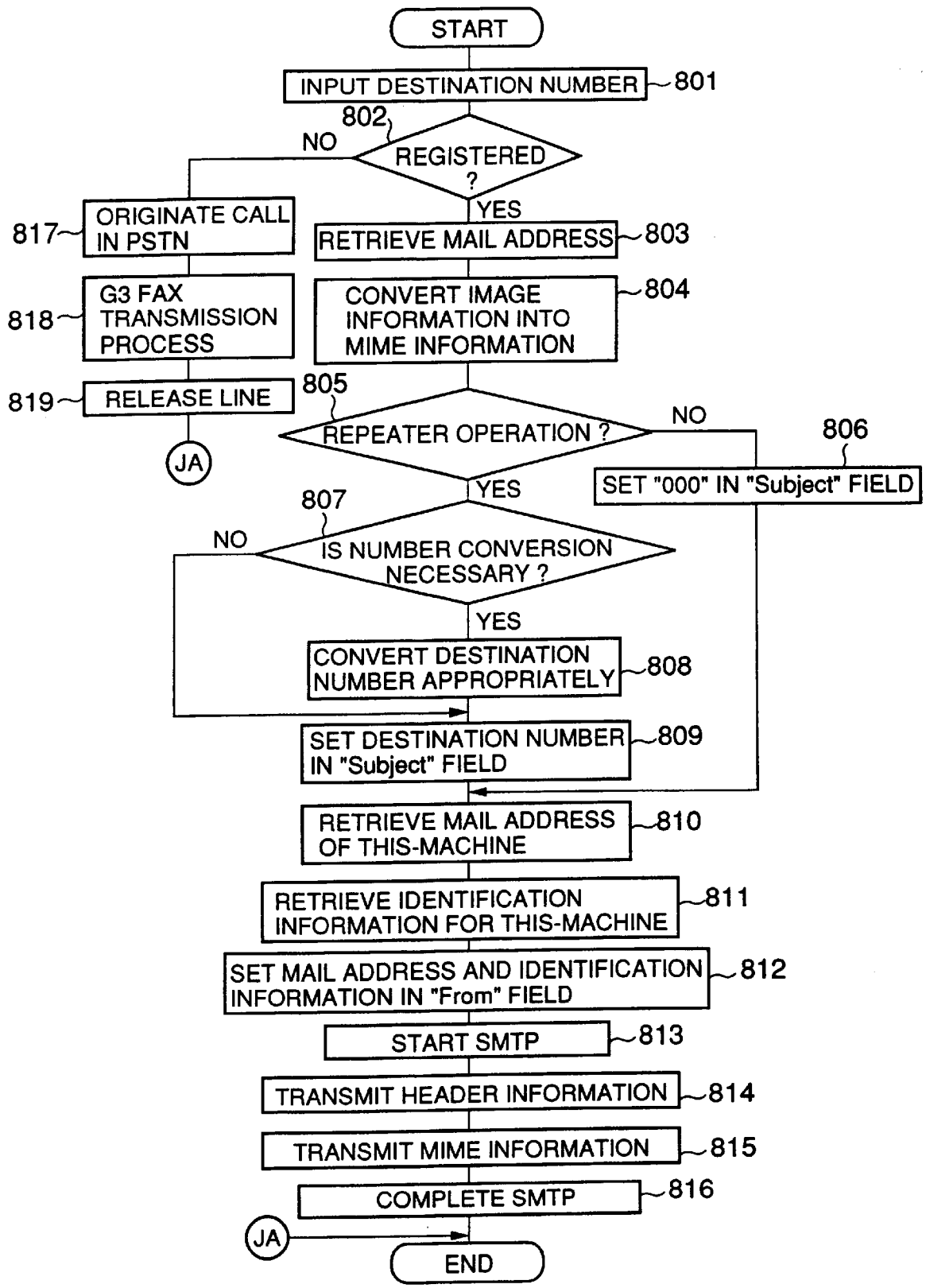
FIG. 18 is a flowchart of a process executed by an Internet facsimile machine operated for facsimile transmission according to the fourth embodiment.

FIG. 18 is a flowchart of a process executed by an Internet facsimile machines FI1 and FI2 operated for facsimile transmission according to the fourth embodiment.

When the Internet facsimile machine is fed an input of a destination telephone number by user operation for transmission (step 801), a determination is then made as to whether the input telephone number is registered in the telephone number conversion table (step 802). If an affirmative answer is yielded in step 802, the corresponding mail address is retrieved (step 803). Image data produced by reading an original set in the scanner 5 is encoded for compression by the coder/decoder 8. The resultant image information is subject to the base64 encoding so as to produce MIME information (step 804).

A determination is made as to whether a repeater operation is requested (step 805). If a repeater operation is not requested, that is, if a negative answer is yielded in step 805, "000" is set in the "Subject" field (step 806).

If a repeater operation is requested, that is, if an affirmative answer is yielded in step 805, a determination is made as to whether the input destination telephone number is to be converted into a domestic telephone number for the repeater machine (step 807). If an affirmative answer is yielded in step 807, the input telephone number is converted into a domestic telephone number (step 808). The destination telephone number or the domestic telephone number after conversion is set in the "Subject" field (step 809).

Subsequently, the Internet facsimile machine retrieves a mail address (user address) for this-machine (step 810) and also retrieves transmitting machine identification information (TSI) set in this-machine (step 811). A value obtained by joining the transmitting machine identification information and the user address is set in the "From" field (step 812).

A predetermined SMTP procedure is then started (step 813). The header information is sent to the local area network (step 814) and the message body (MIME information) is sent to the local area network (step 815). The SMTP procedure is completed (step 816), thus concluding the image information transmission operation using the electronic mail message.

If the input telephone number is not registered in the telephone number conversion table, that is, if a negative answer is yielded in step 802, a call is originated in the international PSTN using the input telephone number (step 817). A predetermined Group 3 facsimile transmission process is executed so as to transmit the image information of the original set in the scanner 5 (step 818).

When the image information has been transmitted, the line is released (step 819), thus concluding the image information transmission operation.

Figure 19:
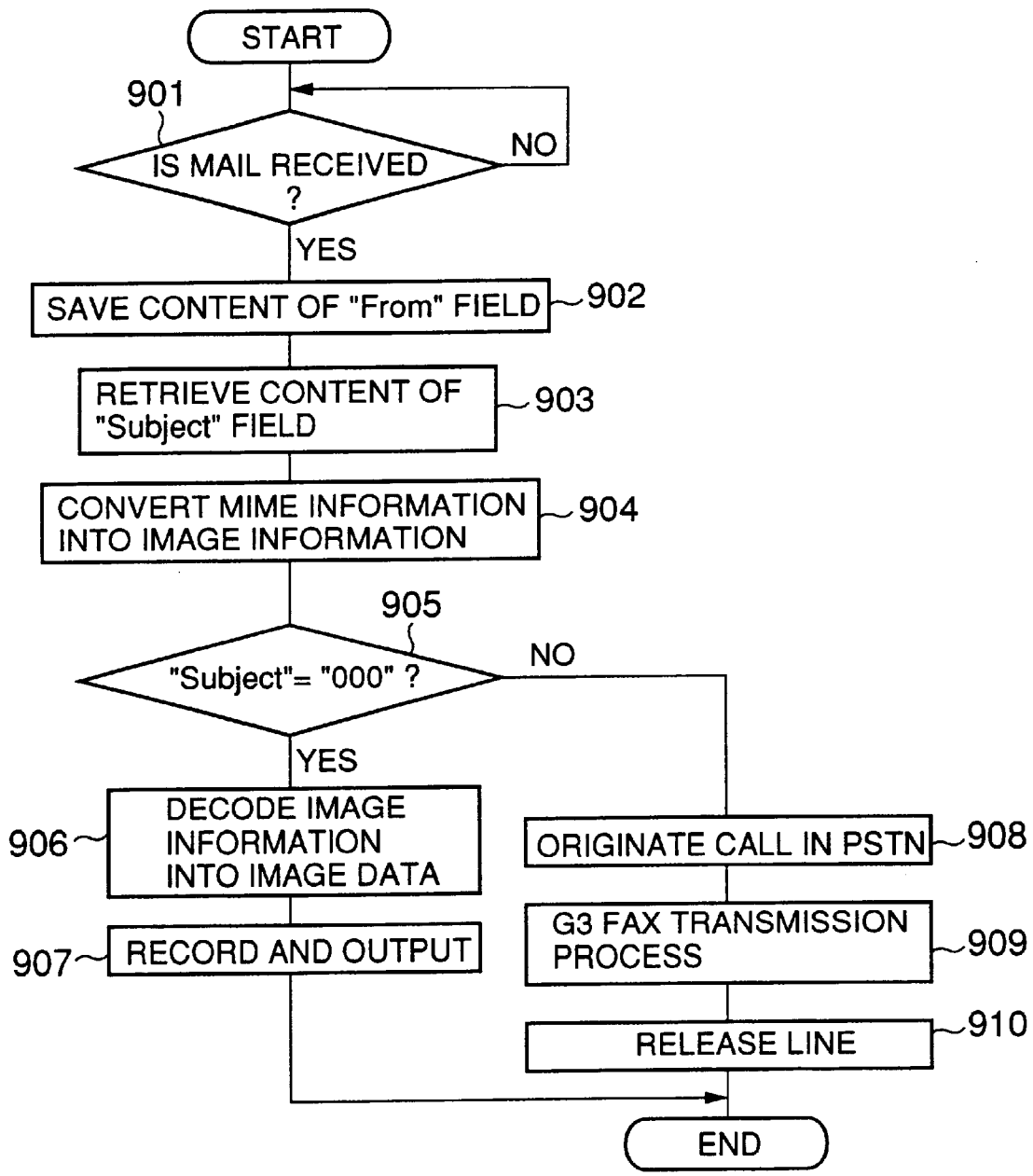
FIG. 19 is a flowchart of a process executed by an Internet facsimile machine receiving the electronic mail message according to the fourth embodiment.

FIG. 19 is a flowchart of a process executed by an Internet facsimile machine receiving the electronic mail message according to the fourth embodiment.

Upon receiving the electronic mail message (YES in step 901), the Internet facsimile machine saves the content of the "From" field (step 902), retrieves the content of the "Subject" field (step 903) and subjects the MIME information in the message body to reverse base64 encoding so as to reproduce image information (step 904).

A determination is made as to whether the content of the "Subject" field is "000" (step 905). If an affirmative answer is yielded in step 905, the image information is decoded by the coder/decoder 8 into original image data (step 906). The resultant image data is transferred to the plotter 6 so as to record and output the received image (step 907).

If the content of the "Subject" field is not "000", that is, if a negative answer is yielded in step 905, a call is originated in the international PSTN using the telephone number set in the "Subject" field (step 908). A predetermined Group 3 facsimile transmission procedure is executed so as to transmit the received image information (step 909).

When the image information has been transmitted, the line is released (step 910), thus concluding the image information transmission operation.

Upon completing the repeater operation, the message recipient Internet facsimile machine sends an electronic mail message as shown in FIG. 20 to the Internet facsimile machine that requested the repeater operation so as to report the result of transmission. The message could be in Japanese as shown in FIG. 20 if an electronic mail message of a MIME type is used. "000" is set in the "Subject" field since it is not required for the message body to be forwarded.

Figure 21:
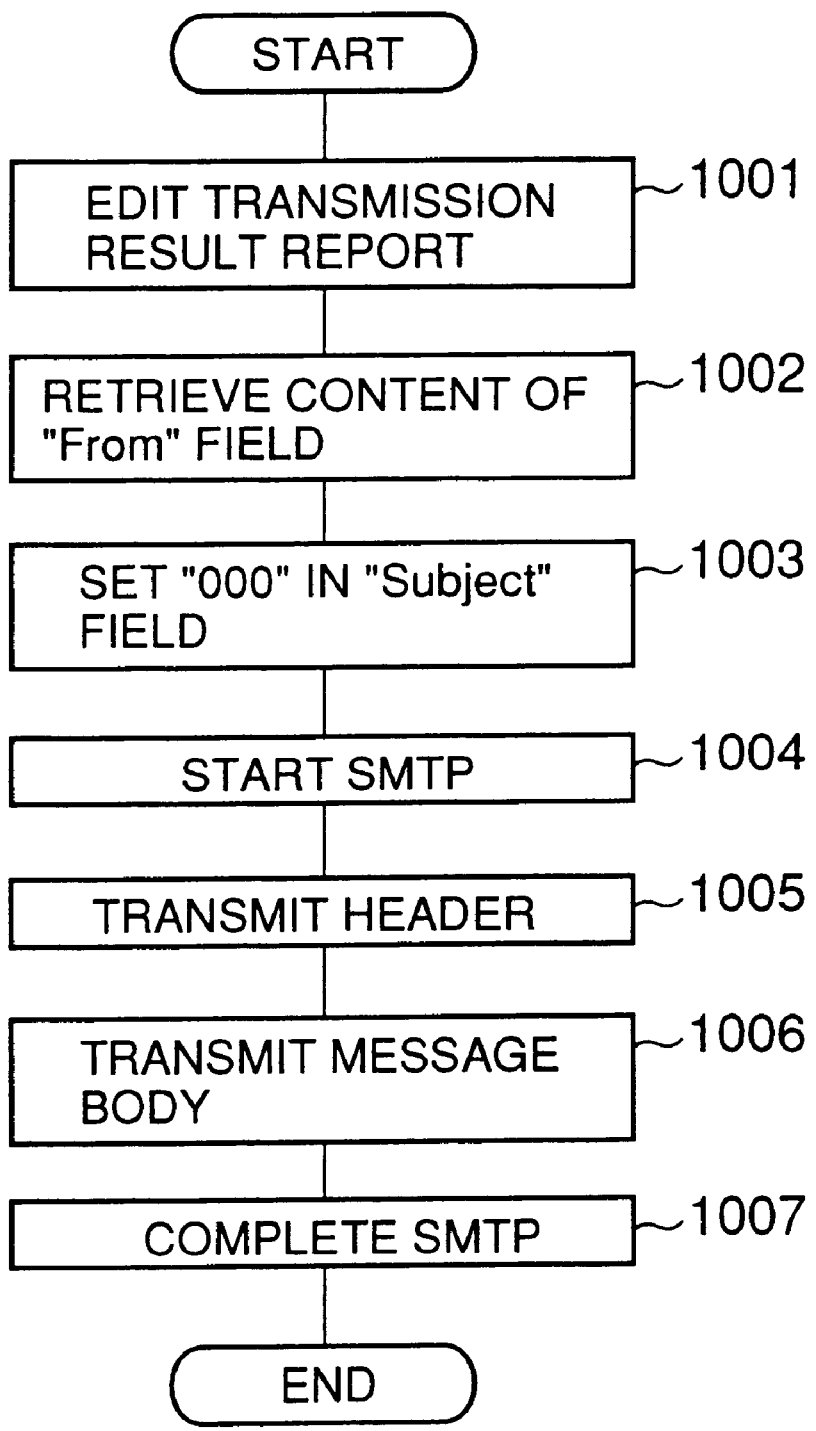
FIG. 21 is a flowchart of a process executed by an Internet facsimile machine to send a facsimile transmission report as shown in FIG. 20.

FIG. 21 is a flowchart of a process executed by an Internet facsimile machine to send a facsimile transmission report.

First, a body of the report indicating the transmission result is prepared (step 1001). The content of the "From" field saved in step 902 is retrieved so as to produce header information (step 1002). "000" is set in the "Subject" field of the header information (step 1003), thus completing the electronic mail message to be transmitted to the requesting machine.

Subsequently, a predetermined SMTP procedure is started (step 1004) so as to transmit the header information to the local area network (step 1005) and transmit the message body (MIME information) to the local area network (step 1006). The SMTP procedure is completed (step 1007), thus concluding the operation of sending the transmission result report in the form the electronic mail message.

The Internet facsimile machine receiving the electronic mail message as shown in FIG. 20 may produce image data representing the message body so as to record and output the message by the plotter 6.

Thus, the fourth embodiment significantly reduces the communication for an image information transmission to an overseas facsimile machine by using an Internet facsimile machine located close the destination overseas facsimile machine as a repeater.

In the fourth embodiment described above, the image information transmitted in the form of electronic mail is of a non-multipart MIME type. The "Subject" field of the header information is used to carry the destination telephone number. However, more detailed information can be sent using electronic mail of a multipart MIME type.

FIG. 22 shows a sample electronic mail message of a multipart MIME type used to request a repeater operation. The electronic mail message of FIG. 22 is of basically the same MIME type as the message shown in FIG. 14. Therefore, description for like sections in the electronic mail message is omitted.

Only the user address of the transmitting Internet facsimile machine is entered in the "From" field of the header information. As described below, the transmitting machine identification information (TSI) is indicated using a part of multipart MIME information. A description "message transfer" is entered in the "Subject" field of the header information so as to indicate to the recipient of the message that the image information is to be forwarded.

The message body comprises a "MIME-Version" field for indicating that the message body is of a MIME type, a "Content-Type" field for indicating that the message is of a multipart type, a "boundary" field for indicating an essential part of a character string for delimiting different parts of the message, and data for the respective parts.

A "transfer from" subfield in which the transmitting machine identification information is set and a "transfer to" subfield in which the destination telephone number (domestic number) indicating the destination of the repeater operation is set are provided at the head of the MIME information.

MIME information derived from image information by base64 encoding is set in the next part of the MIME information. A "name" subfield is attached to the "Content-Type" field so as to indicate a file name of the transmitted image information.

FIG. 23 is a flowchart showing a process executed by a first Internet facsimile machine for transmitting image information to a second Internet facsimile machine in the form of an electronic mail message as shown in FIG. 22.

When the first Internet facsimile machine is fed an input of a destination telephone number by user operation for transmission (step 1101), a determination is then made as to whether the input telephone number is registered in the telephone number conversion table (step 1102). If an affirmative answer is yielded in step 1102, the corresponding mail address is retrieved (step 1103). Image data produced by reading an original set in the scanner 5 is encoded for compression by the coder/decoder 8. The resultant image information is subject to the base64 encoding so as to produce MIME information (step 1104).

A determination is made as to whether a repeater operation is requested (step 1105). If a repeater operation is not requested, that is, if a negative answer is yielded in step 1105, "000" is set in the "Subject" field (step 1106).

If a repeater operation is requested, that is, if an affirmative answer is yielded in step 1105, MIME information other than the message body (image information) of the electronic mail message is produced so as to complete the multipart MIME information (step 1107).

Subsequently, a determination is made as to whether the input destination telephone number is to be converted into a domestic telephone number for the repeater machine (step 1108). If an affirmative answer is yielded in step 1108, the input telephone number is converted into a domestic telephone number (step 1109). The destination telephone number or the domestic telephone number after conversion is set in the "Subject" field (step 1110).

Subsequently, the Internet facsimile machine retrieves a mail address (user address) for this-machine (step 1111) and sets the user address in the "From" field (step 1112).

A predetermined SMTP procedure is then started (step 1113). The header information is sent to the local area network (step 1114) and the message body (non-multipart MIME information or multipart MIME information) is sent to the local area network (step 1115). The SMTP procedure is completed (step 1116), thus concluding the image information transmission operation using the electronic mail message.

If the input telephone number is not registered in the telephone number conversion table, that is, if a negative answer is yielded in step 1102, a call is originated in the international PSTN using the input telephone number (step 1117). A predetermined Group 3 facsimile transmission process is executed so as to transmit the image information of the original set in the scanner 5 (step 1118).

When the image information has been transmitted, the line is released (step 1119), thus concluding the image information transmission operation.

FIG. 24 is a flowchart of a process executed by the second Internet facsimile machine receiving the electronic mail message as shown in FIG. 22.

Upon receiving the electronic mail message (YES in step 1201), the second Internet facsimile machine saves the content of the "From" field (step 1202), retrieves the content of the "Subject" field (step 1203) and subjects the MIME information in the message body to reverse base64 encoding so as to reproduce image information (step 1204).

A determination is made as to whether the content of the "Subject" field is "000" (step 1205). If an affirmative answer is yielded in step 1205, the image information is decoded by the coder/decoder 8 into original image data (step 1206). The resultant image data is transferred to the plotter 6 so as to record and output the received image (step 1207).

If the content of the "Subject" field is not "000", that is, if a negative answer is yielded in step 1205, the transmitting machine identification and the destination telephone number (domestic telephone number) are retrieved from the "transfer from" subfield and the "transfer to" subfield of the multipart MIME information, respectively (step 1208). A call is originated in the international PSTN using the destination telephone number thus retrieved (step 1209). A predetermined Group 3 facsimile transmission procedure is executed so as to transmit the received image information (step 1210). It is preferable that the transmitting machine identification information retrieved from the "transfer from" subfield is entered as the transmitting machine identification information at the head of the image information.

When the image information has been transmitted, the line is released (step 1211), thus concluding the image information transmission operation.

Thus, by forming an electronic mail message for requesting a repeater operation using the multipart MIME information, information necessary for requesting the repeater operation can be appropriately sent, thus improving convenience of the facsimile transmission.

The embodiments described above assumes that image information is sent over the Internet (INET) in the form of electronic mail. A note should be made of the fact that it is impossible to tell how electronic mail is routed over the Internet and that there is always a likelihood that the message may be monitored and decoded along the way.

Accordingly, the Internet facsimile machine may optionally specify whether the Internet (INET) is used so as to assure the user of safe transmission.

Figure 25:
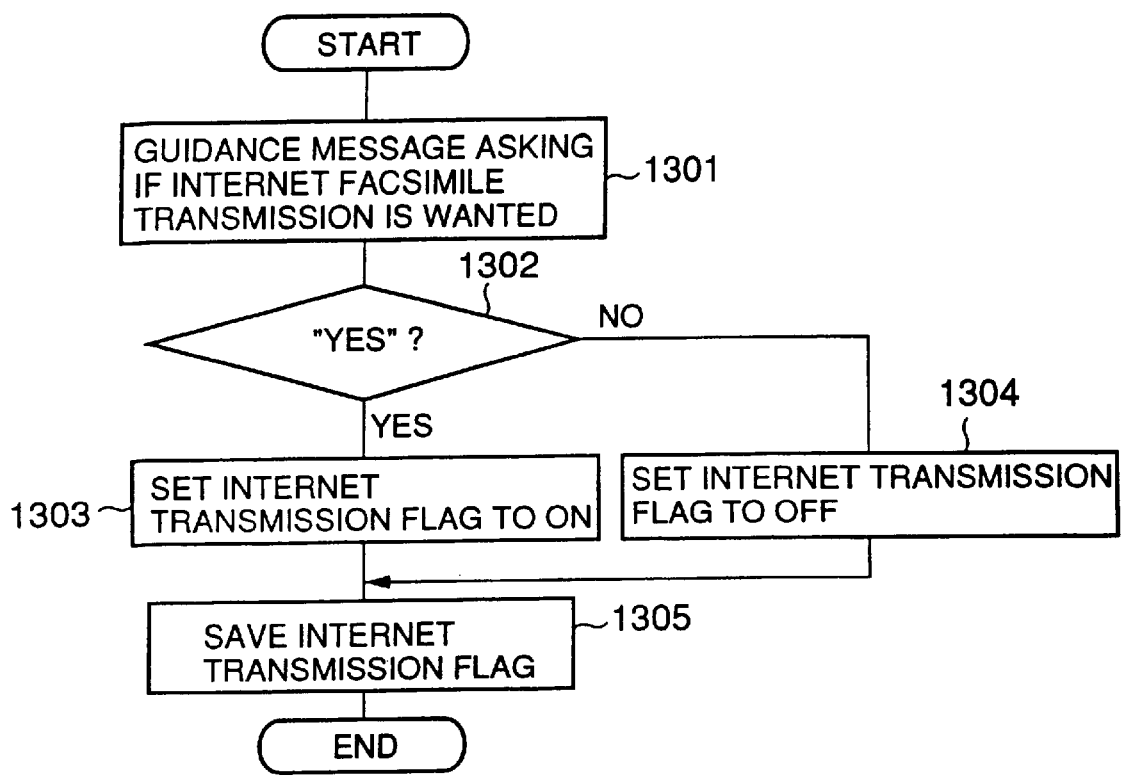
FIG. 25 is a flowchart showing a process executed by an Internet facsimile machine equipped to give the user an option of using the Internet and not using the Internet.

FIG. 25 is a flowchart showing a process executed by an Internet facsimile machine equipped to give the user an option of using the Internet and not using the Internet.

Referring to FIG. 25, the Internet facsimile machine displays a guidance message asking whether the user wants Internet transmission (step 1301). When the user inputs a request for Internet transmission (YES in step 1302), an Internet transmission flag is set to ON (step 1303). When the user inputs that Internet transmission is not wanted (NO in step 1302), the Internet transmission flag is set to OFF (step 1304).

The Internet transmission flag is set to ON (step 1305).

FIGS. 26 and 27 are a flowchart showing a process executed by an Internet facsimile machine equipped to give the user an option of using the Internet and not using the Internet.

When the Internet facsimile machine is fed an input of a destination telephone number by user operation for transmission (step 1401), a determination is made as to whether the Internet transmission flag is set to ON (step 1402). If an affirmative answer is yielded in step 1402, a guidance message asking whether the user wants Internet transmission is displayed (step 1403). If the user inputs a request to use the Internet (YES in step 1404), transmission using the Internet proceeds.

A determination is made as to whether the input telephone number is registered in the telephone number conversion table (step 1405). If an affirmative answer is yielded in step 1405, the corresponding mail address is retrieved (step 1406). Image data produced by reading an original set in the scanner 5 is encoded for compression by the coder/decoder 8. The resultant image information is subject to the base64 encoding so as to produce MIME information (step 1407).

A determination is made as to whether a repeater operation is requested (step 1408). If a repeater operation is not requested, that is, if a negative answer is yielded in step 1408, "000" is set in the "Subject" field (step 1409).

If a repeater operation is requested, that is, if an affirmative answer is yielded in step 1408, a determination is made as to whether the input destination telephone number is to be converted into a domestic telephone number for the repeater machine (step 1410). If an affirmative answer is yielded in step 1410, the input telephone number is converted into a domestic telephone number (step 1411). The destination telephone number or the domestic telephone number after conversion is set in the "Subject" field (step 1412).

Subsequently, the Internet facsimile machine retrieves a mail address (user address) for this-machine (step 1413) and also retrieves transmitting machine identification information (TSI) set in this-machine (step 1414). A value obtained by joining the transmitting machine identification information and the user address is set in the "From" field (step 1415).

A predetermined SMTP procedure is then started (step 1416). The header information is sent to the local area network (step 1417) and the message body (MIME information) is sent to the local area network (step 1418). The SMTP procedure is completed (step 1419), thus concluding the image information transmission operation using the electronic mail message.

If the Internet transmission flag is set to OFF, that is, if a negative answer is yielded in step 1402, if the user inputs that the Internet transmission is not wanted responsive to the Internet transmission guidance message, that is, if a negative answer is yielded in step 1404, or if the input telephone number is not registered in the telephone number conversion table, that is, if a negative answer is yielded in step 1405, a call is originated in the international PSTN using the input telephone number (step 1420). A predetermined Group 3 facsimile transmission process is executed so as to transmit the image information of the original set in the scanner 5 (step 1421).

When the image information has been transmitted, the line is released (step 1422), thus concluding the image information transmission operation.

According to the operation described above, the user can request or cancel Internet transmission with each Internet facsimile machine. Also, the user can request or cancel Internet transmission for each image information transmission. Thus, the user can request or-cancel facsimile transmission over the Internet depending as required.

Instead of causing the Internet facsimile machine to display a guidance message asking the user who is operating the machine whether transmission over the Internet is desired, Internet transmission can be requested or canceled by direct key input. For example, an input of "**" may specify Internet transmission.

The description of the above embodiments assumes that the public switched telephone network is used. However, an ISDN may used instead of the public switched telephone network. When an ISDN is used, the Internet facsimile machine should have the Group 4 facsimile transmission function.

In the above embodiments, the electronic mail message is sent after the image information is converted into MIME information. However, conversion of the image information into MIME information and electronic mail transmission process may be performed in parallel.

The present invention is not limited to the above-described embodiments, and various variations and modifications may be possible without departing from the scope of the present invention.

What is claimed is:

1. An Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, said Internet facsimile machine comprising:

subaddress information table means for storing subaddress information associated with destination terminals and mail addresses of repeater Internet facsimile machines that provide a repeater operation for information destined for the destination terminal associated with the subaddress, in such a way as to relate each of the subaddresses to the corresponding mail address;

mail address retrieving means for searching said subaddress information table means to retrieve the mail address that corresponds to a subaddress received via a facsimile transmission procedure;

repeater operation requesting means for requesting the repeater Internet facsimile machine associated with the mail address retrieved by said mail address retrieving means to automatically forward received image information to the destination terminal associated with the subaddress via a facsimile transmission procedure, by sending an electronic mail message to said repeater Internet facsimile machine associated with the retrieved mail address; and output means, for outputting the received image information when no subaddress is received via the facsimile transmission procedure.

2. The Internet facsimile machine as claimed in claim 1, wherein a content of subaddress information is set in one of a Subject field of said electronic mail message and a predetermined area of a message body of said electronic mail message.

3. The Internet facsimile machine as claimed in claim 1, wherein said electronic mail message contains data produced by converting the received image information into message body data of a predetermined type.

4. An Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, said Internet facsimile machine comprising:

subaddress information table means for storing subaddress information associated with destination terminals, repeater mail addresses of repeater Internet facsimile machines that provide a repeater operation for information destined for the destination terminal associated with the subaddress, and destination mail addresses of destination Internet facsimile machines designated as a destination, in such a way as to relate each of the subaddresses to the corresponding repeater mail address or the corresponding destination mail address;

mail address retrieving means for searching said subaddress information table means to retrieve one of the repeater mail address and the destination mail address that corresponds to a subaddress received via a facsimile transmission procedure;

repeater operation requesting means for requesting, when the repeater mail address is retrieved by said mail address retrieving means, the repeater Internet facsimile machine associated with the repeater mail address retrieved by said mail address retrieving means to automatically forward received image information to the terminal associated with the subaddress via a facsimile transmission procedure, by sending an electronic mail message to said repeater Internet facsimile machine associated with the retrieved mail address;

transmitting means for transmitting, when the destination mail address is retrieved by said mail address retrieving means, the received image information to the destination Internet facsimile machine associated with the destination mail address retrieved by said mail address retrieving means, by sending an electronic mail message to said destination Internet facsimile machine associated with the retrieved destination mail address; and output means, for outputting the received image information when no subaddress is received via the facsimile transmission procedure.

5. The Internet facsimile machine as claimed in claim 4, wherein said electronic mail message contains data produced by converting the received image information into message body data of a predetermined type.

6. An Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, said Internet facsimile machine comprising:

scanner means for scanning an original document and generating image information;

input means allowing a user to input a destination telephone number;

destination management information storage means for storing mail addresses used to exchange data with compatible Internet facsimile machines over the Internet, telephone numbers used to exchange data with compatible Internet facsimile machines over the public network, and end terminal telephone numbers used to exchange data with an end terminal served by a repeater operation of the compatible Internet facsimile machine associated with the telephone number, in such a way as to relate each of the mail addresses to the corresponding telephone number and the end terminal telephone number;

determining means for determining whether a destination telephone number specified by a user via said input means is registered as one of the end terminal telephone numbers in said destination management information storage means;

converting means for converting, when the specified destination telephone number is an international telephone number, the specified destination telephone number into a domestic telephone number;

Internet transmission means for retrieving, when said determining means yields an affirmative answer, the mail address that corresponds to the specified destination telephone number from said destination management information storage means, for converting said image information to be transmitted into message body data for an electronic mail message, for setting the retrieved mail address in a To field of a header information of the electronic mail message, for setting the specified destination telephone number or the domestic telephone number in a Subject field of the header information of the electronic mail message, and for transmitting the resultant electronic mail message to the compatible Internet facsimile machine providing the repeater operation, via the local area network over the Internet;

reception means for receiving electronic mail;

reverse conversion means for subjecting the message body data of a received electronic mail message to reverse conversion so as to reproduce said image information generated by said scanner means, when one of the end terminal telephone numbers is set in the Subject field of the header information of the received electronic mail message; and forwarding means for originating a call to the end terminal associated with the end terminal telephone number found in the Subject field, using a public network, so as to transmit the image information reproduced by said reverse conversion means to the end terminal.

7. The Internet facsimile machine as claimed in claim 6, wherein the end terminal telephone number is converted into a domestic number compatible with the corresponding telephone number registered in said destination management information storage means, before being set in the Subject field of the header information of the electronic mail message.

8. The Internet facsimile machine as claimed in claim 7, wherein a mail address for this-machine is set in a From field of header information in the electronic mail message, a report electronic mail message for reporting on a result of transmission is produced after the received electronic mail message has been processed, and said report electronic mail message is sent to the mail address set in the From field of the header information of the received electronic mail message, a predetermined fixed value being set in the Subject field of the header information of said report electronic mail message.

9. The Internet facsimile machine as claimed in claim 6, wherein a mail address for this-machine is set in a From field of the header information in the electronic mail message.

10. The Internet facsimile machine as claimed in claim 9, wherein a report electronic mail message for reporting on a result of transmission is produced after the received electronic mail message has been processed, and said report electronic mail message is sent to the mail address set in the From field of the header information of the received electronic mail message.

11. The Internet facsimile machine as claimed in claim 6, further comprising setting means for specifying whether the image information is to be transmitted in the form of electronic mail.

12. An Internet facsimile machine connected to a local area network connected via a leased line to an Internet service provider, and having a function of exchanging electronic mail messages over the local area network and the Internet, and a function of exchanging facsimile data using a public network according to a facsimile transmission procedure, said Internet facsimile machine comprising:

scanner means for scanning an original document and generating image information;

input means allowing a user to input a destination telephone number;

destination management information storage means for storing mail addresses used to exchange data with compatible Internet facsimile machines over the Internet, telephone numbers used to exchange data with compatible Internet facsimile machines over the public network, and end terminal telephone numbers used to exchange data with an end terminal served by a repeater operation of the compatible Internet facsimile machine associated with the telephone number, in such a way as to relate each of the mail addresses to the corresponding telephone number and the end terminal telephone number;

determining means for determining whether a destination telephone number specified by a user via said input means is registered as one of the end terminal telephone numbers in said destination management information storage means;

converting means for converting, when the specified destination telephone number is an international telephone number, the specified destination telephone number into a domestic telephone number;

Internet transmission means for retrieving, when said determining means yields an affirmative answer, the mail address that corresponds to the specified destination telephone number from said destination management information storage means, for converting image information to be transmitted into message body data for an electronic mail message, for setting the retrieved mail address in a To field of a header information of the electronic mail message, for setting the specified destination telephone number or the domestic telephone number in a predetermined area of a message body of the electronic mail message, and for transmitting the resultant electronic mail message to the compatible Internet facsimile machine providing the repeater operation, via the local area network over the Internet;

reception means for receiving electronic mail;

reverse conversion means for subjecting the message body data of a received electronic mail message to reverse conversion so as to reproduce said image information generated by said scanner means, when one of the end terminal telephone numbers is set in said predetermined area of the message body of the received electronic mail message; and forwarding means for originating a call to the end terminal associated with the end terminal telephone number found in said predetermined area of the message body, using a public network, so as to transmit the image information reproduced by said reverse conversion means to the end terminal.

13. The Internet facsimile machine as claimed in claim 12, wherein the end terminal telephone number is converted into a domestic number compatible with the corresponding telephone number registered in said destination management information storage means, before being set in said predetermined area of the message body of the electronic mail message.

14. The Internet facsimile machine as claimed in claim 12, wherein a mail address for this-machine is set in a From field of the header information in the electronic mail message.

15. The Internet facsimile machine as claimed in claim 14, wherein a report electronic mail message for reporting on a result of transmission is produced after the received electronic mail message has been processed, and said report electronic mail message is sent to the mail address set in the From field of the header information of the received electronic mail message.

16. The Internet facsimile machine as claimed in claim 12, further comprising setting means for specifying whether the image information is to be transmitted in the form of electronic mail.

17. An Internet facsimile machine connected to a local area network connected via a leased line to an Internet service provider, and having a function of exchanging electronic mail messages over the local area network and the Internet, and a function of exchanging facsimile data using a public network, according to a facsimile transmission procedure, said Internet facsimile machine comprising:

memory for storing a subaddress information table storing subaddress information received according to the facsimile transmission procedure and mail addresses of Internet facsimile machines that provide a repeater operation for information destined to a terminal associated with the subaddress, in such a way as to relate each of the subaddresses to the corresponding mail address;

a system controller adapted to search said subaddress information table to retrieve the mail address that corresponds to the subaddress received according to the facsimile transmission procedure and to request the Internet facsimile machine associated with the mail address retrieved to automatically forward received image information to the terminal associated with the subaddress via a facsimile transmission procedure, by sending an electronic mail message to said Internet facsimile machine associated with the retrieved mail address; and a printer for outputting the received image information when no subaddress is received via the facsimile transmission procedure.

18. A method of operating an Internet facsimile machine connected to a local area network connected via a leased line to an Internet service provider, and having a function of exchanging electronic mail messages over the local area network and the Internet, and a function of exchanging facsimile data using a public network, according to a facsimile transmission procedure, said Internet facsimile control method comprising steps of:

storing a subaddress information table received according to the facsimile transmission procedure and mail addresses of Internet facsimile machines that provide a repeater operation for information destined to a terminal associated with the subaddress, in such a way as to relate each of the subaddresses to the corresponding mail address;

searching said subaddress information table to retrieve the mail address that corresponds to the subaddress received according to the facsimile transmission procedure;

requesting the Internet facsimile machine associated with the mail address retrieved to automatically forward received image information to the terminal associated with the subaddress via a facsimile transmission procedure, by sending an electronic mail message to said Internet facsimile machine associated with the retrieved mail address; and printing the received image information when no subaddress is received via the facsimile transmission procedure.

\* \* \* \* \*